(12) United States Patent
Kageoka et al.

(10) Patent No.: US 6,204,300 B1
(45) Date of Patent: Mar. 20, 2001

(54) LOW RESILIENCE URETHANE FOAM

(75) Inventors: Masakazu Kageoka; Katsumi Inaoka; Takashi Kumaki, all of Osaka (JP)

(73) Assignee: Takeda Chemical Industries, Ltd., Osaka (JP)

( * ) Notice: Subject to any disclaimer, the term of this patent is extended or adjusted under 35 U.S.C. 154(b) by 0 days.

(21) Appl. No.: 09/239,288

(22) Filed: Jan. 29, 1999

(30) Foreign Application Priority Data

Feb. 6, 1998 (JP) .................................................. 10-026149
Sep. 1, 1998 (JP) .................................................. 10-246627

(51) Int. Cl.$^7$ ...................................................... C08G 18/14
(52) U.S. Cl. ............................ 521/174; 521/155; 521/170
(58) Field of Search .................................... 521/155, 170, 521/174

(56) References Cited

U.S. PATENT DOCUMENTS 5,063,253 11/1991 Gansen et al. .
5,128,381 7/1992 Tane et al. .

FOREIGN PATENT DOCUMENTS

| 33 13 624 | 10/1984 | (DE) . |
| 331 941 | 9/1989 | (EP) . |
| 345 678 | 12/1989 | (EP) . |
| 433 878 | 6/1991 | (EP) . |
| WO 98/16567 | 4/1998 | (WO) . |

OTHER PUBLICATIONS

M. Omoto et al., PU China '95 Conference Papers, pp. 325–328 (Nov. 8–10, 1995).
[Interim Publication] M. Kageoka et al., PU China '98 Conference Papers, Paper 35, pp. 1–6 (Apr. 1–3, 1998).
[Interim Publication] M. Kageoka et al., Polyurethanes Expo '98 Conference Proceedings, pp. 115–120 (Sep. 17–20, 1998).

Primary Examiner—John M. Cooney, Jr.
(74) Attorney, Agent, or Firm—Merchant & Gould P.C.

(57) ABSTRACT

Low resilience urethane foam having excellent low resilience at room temperature and having capability of suppressing increase of hardness even at low temperature. The low resilience urethane foam, produced by reaction of urethane foam compositions comprising polyol (a), polyisocyanate (b), catalyst (c) and blowing agent (d), has at least one glass transition point in each of a temperature range of −70° C. to −20°C. and a temperature range of 0° C. to 60° C. Where the glass transition point is expressed as a tan δ peak obtained when measurement on dynamic viscoelasticity of the low resilience urethane foam is carried out at a frequency of 10 herz, at least one of the tan δ peak(s) at the temperature range of −70° C. to −20° C. is 0.15 or more and at least one of the tan δ peak(s) at the temperature range of 0° C. to 60° C. is 0.3 or more.

8 Claims, 22 Drawing Sheets

LOW RESILIENCE URETHANE FOAM

BACKGROUND OF THE INVENTION

1. Field of the Invention

The present invention relates to low resilience urethane foam having excellent low resilience useful as an impact energy absorbing material, a sound insulating material and a vibration damping material. The material is capable of ensuring a uniform pressure distribution to reduce fatigue and pressure gangrene, when used as a cushioning material for chairs and mattresses.

2. Description of the Prior Art

Low resilience urethane foam useful as the impact energy absorbing material, the sound insulating material, the vibration damping material and the cushioning material for chairs and mattresses is known. With the known type of low resilience urethane foam, components of the urethane foam, namely, type of polyisocyanate, functionality and hydroxyl value of polyol, are selected and formulated such that glass transition can be caused at temperature for the urethane foam to be used, i.e., at room temperature, so that low resilience can be imparted to the urethane foam by the glass transition phenomenon.

This known type urethane foam, formulated such that the glass transition can be caused at room temperature, shows excellent low resilience by the glass transition phenomenon at room temperature, but it has a disadvantage that at a temperature less than that of occurence of the glass transition, e.g., at low temperatures of 0° C. or less, the urethane foam becomes glassy and its hardness increases rather drastically from that at room temperature.

SUMMARY OF THE INVENTION

It is, therefore, the object of the present invention to provide low resilience urethane foam having excellent low resilience at room temperature and being low in increase of hardness even at low temperature.

The present invention provides low resilience urethane foam produced by reaction of urethane foam compositions comprising polyol (a), polyisocyanate (b), catalyst (c) and blowing agent (d), characterized in that the low resilience urethane foam has at least one glass transition point in each of a temperature range of −70° C. to −20° C. and a temperature range of 0° C. to 60° C.; and that where the glass transition point is expressed as a tan δ peak obtained when measurement on dynamic viscoelasticity of the low resilience urethane foam is performed at a frequency of 10 herz, the tan δ peak(s) at the temperature range of −70° C. to −20° C. is/are 0.15 or more and the tan δ peak(s) at the temperature range of 0° C. to 60° C. is/are 0.3 or more.

It is preferable that the polyol (a) is at least one polyol selected from the group consisting of polyoxyalkylene polyol, vinyl polymer-containing polyoxyalkylene polyol, polyester polyol, and polyoxyalkylene polyester block copolymer polyol.

Further, it is preferable that the polyol (a) comprises polyol (a-1) of 1.5 to 4.5 in average functionality and 20–70 mgKOH/g in hydroxyl value and polyol (a-2) of 1.5 to 4.5 in average functionality and 140–300 mgKOH/g in hydroxyl value and also contains therein the polyol (a-1) ranging from 32 weight percent to 80 weight percent and the polyol (a-2) ranging from 20 weight percent to 68 weight percent.

It is then preferable that the polyol (a-1) comprises polyoxyalkylene polyol and polyoxyalkylene polyester block copolymer polyol and also contains therein the polyoxyalkylene polyol and the polyoxyalkylene polyester block copolymer polyol, with the range from 30 weight percent to 70 weight percent, respectively. It is also preferable that the polyol (a-2) is polyoxyalkylene polyol in which oxyethylene units of not less than 20 weight percent, particularly preferable not less than 60 weight percent, are contained in the oxyalkylene unit.

The polyisocyanate (b) is preferably toluene diisocyanate, and the blowing agent (d) is preferably water.

Also, it is preferable that a storage modulus (E'), which is obtained together with the tan δ peak when the measurement on the dynamic viscoelasticity of the low resilience urethane foam is performed at a frequency of 10 herz, is not more than 5 MPa at temperature of not less than 0° C., further preferably not more than 5 MPa at temperature of not less than −20° C.

The low resilience urethane foam of the present invention has an excellent low resilience of the impact resilience (ball rebound) modulus of not more than 20% at 25° C. and yet minimizes the tendency to increase the hardness even at low temperatures. Therefore, even in a low temperature range, the urethane foam can be effectively used as the impact energy absorbing material, the sound insulating material, the vibration damping material and the cushioning material for chairs and mattresses.

DETAILED DESCRIPTION OF THE EMBODIMENTS

Figure 1:
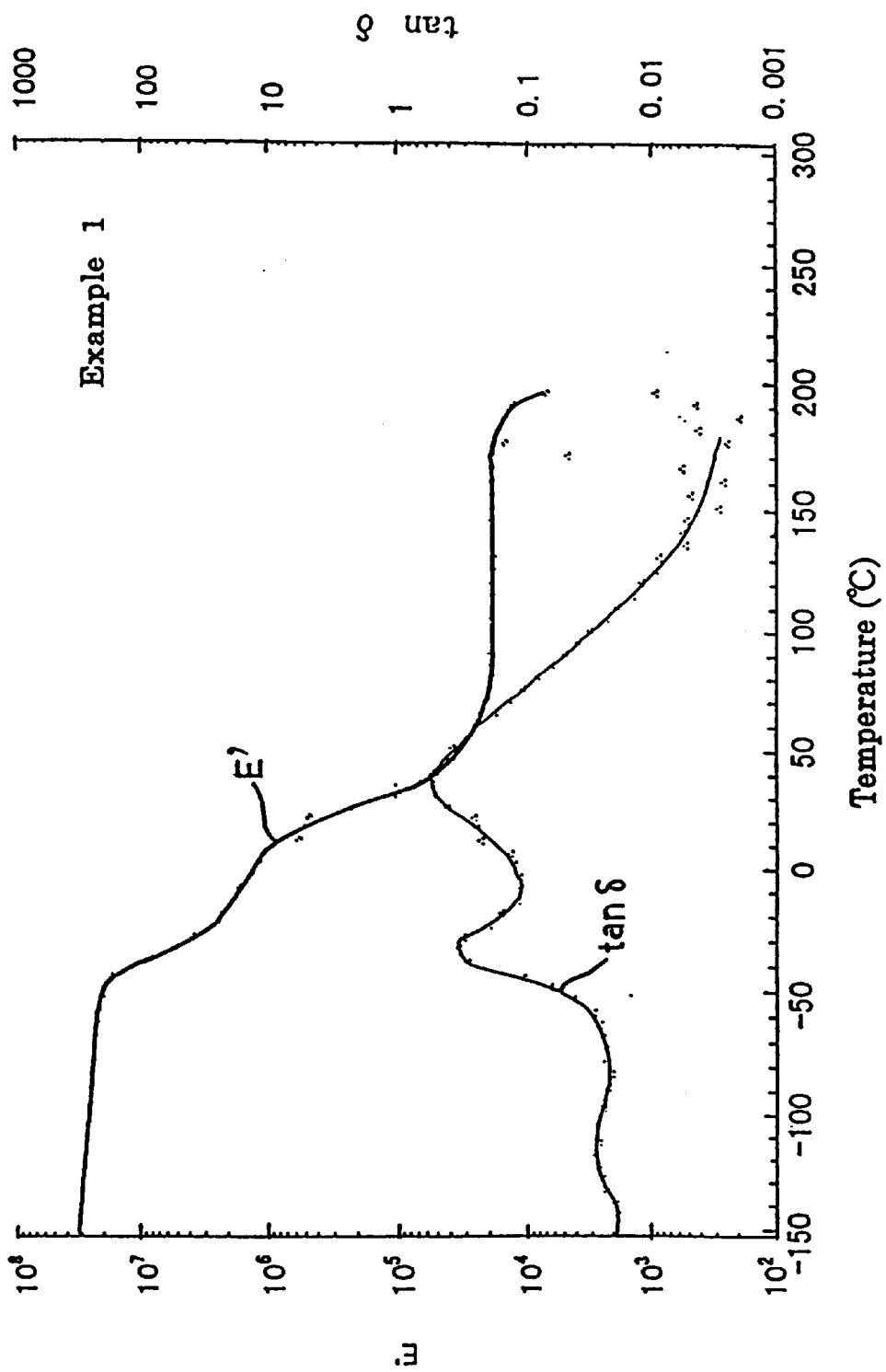
FIG. 1 shows a measurement result for viscoelasticity of Example 1.
Figure 2:
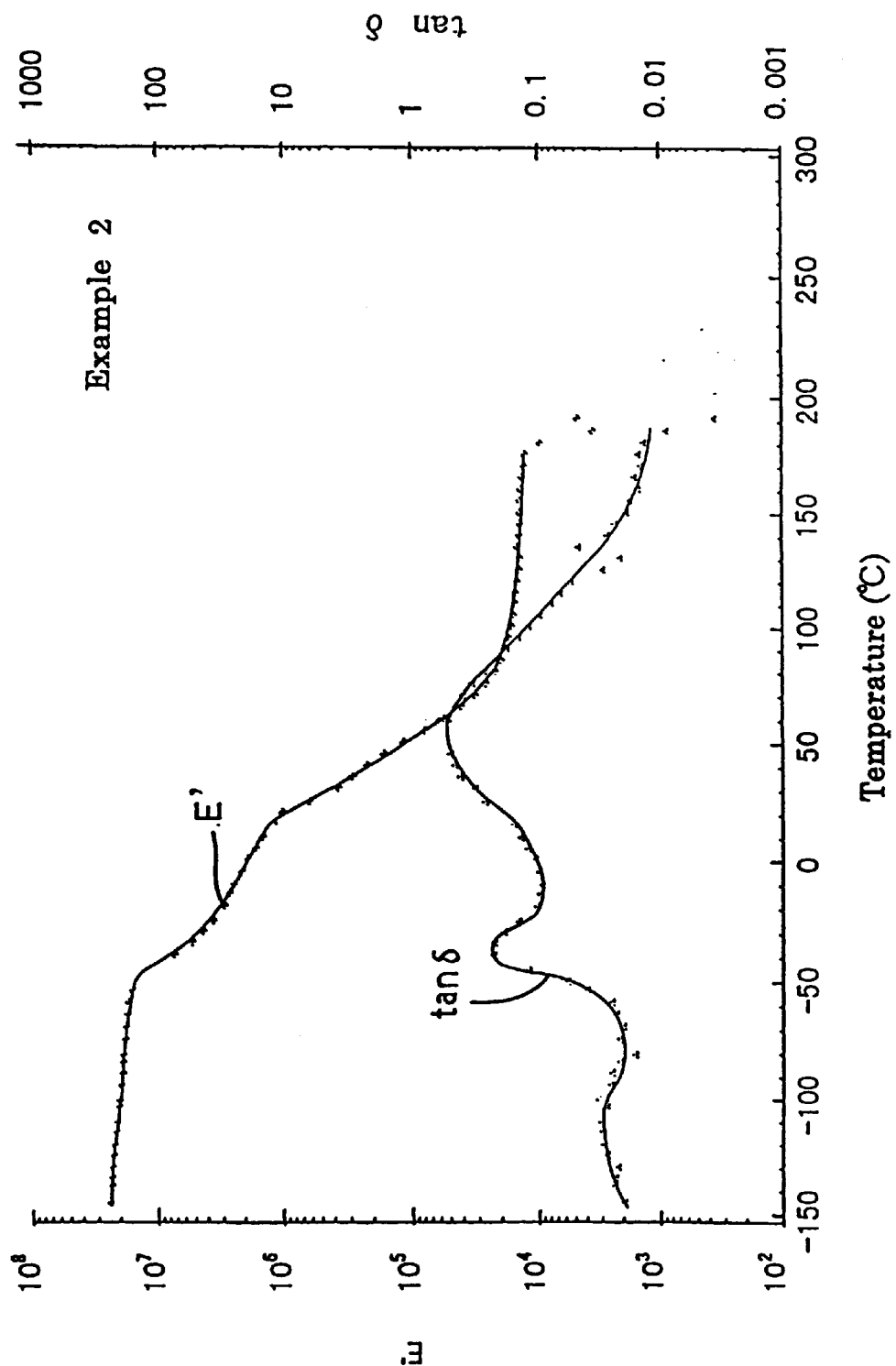
FIG. 2 shows a measurement result for viscoelasticity of Example 2.
Figure 3:
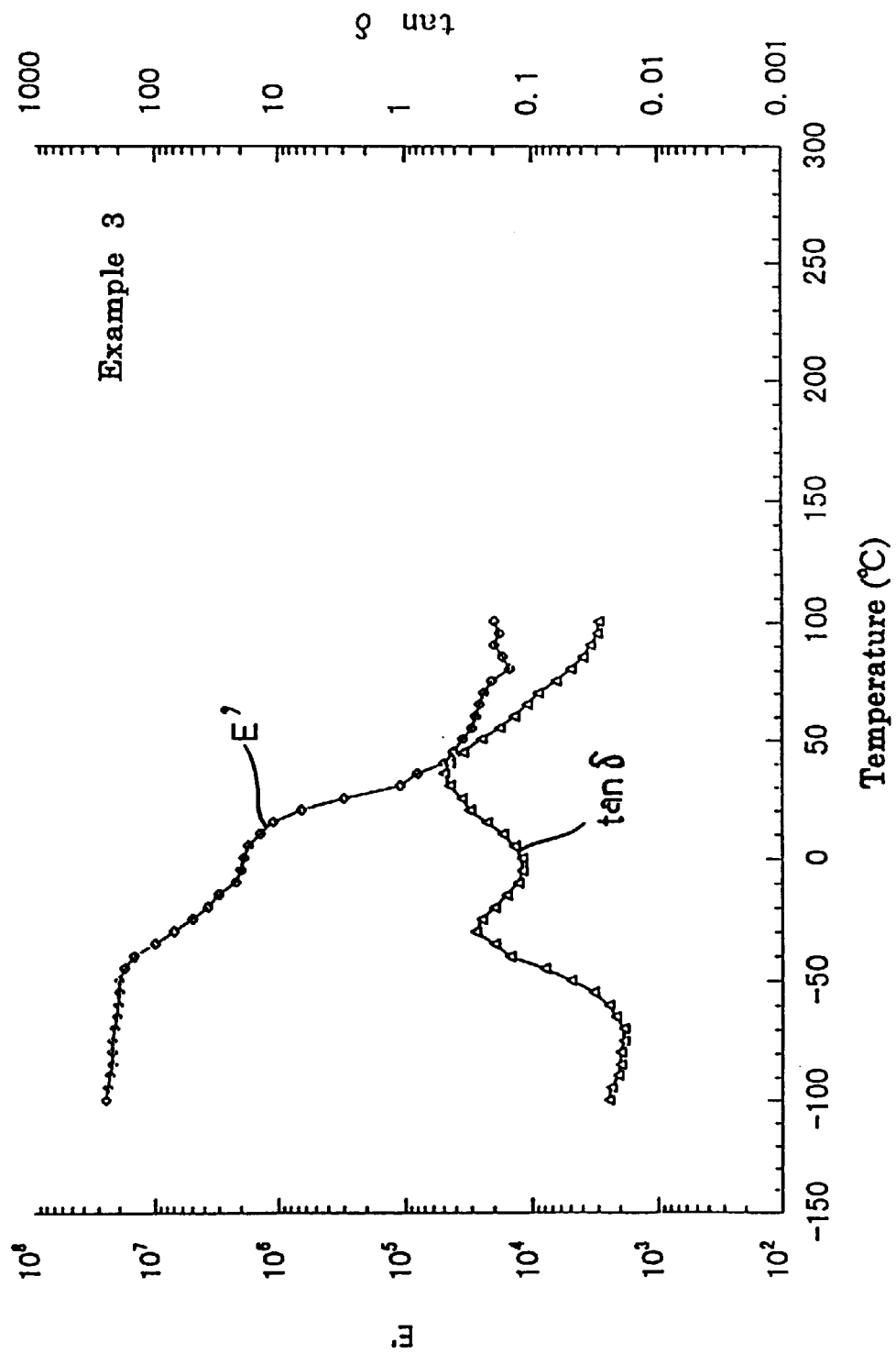
FIG. 3 shows a measurement result for viscoelasticity of Example 3.
Figure 4:
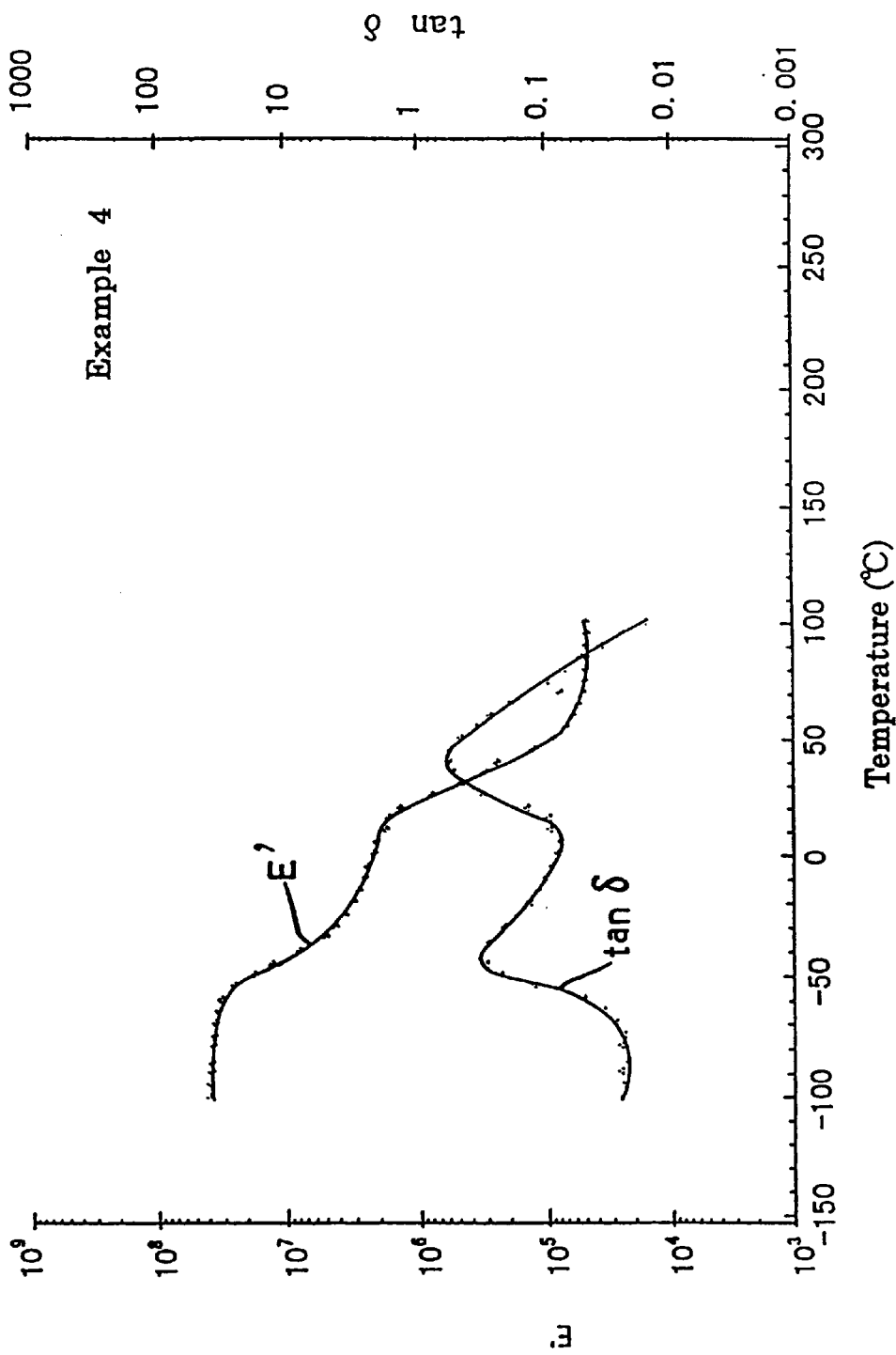
FIG. 4 shows a measurement result for viscoelasticity of Example 4.
Figure 5:
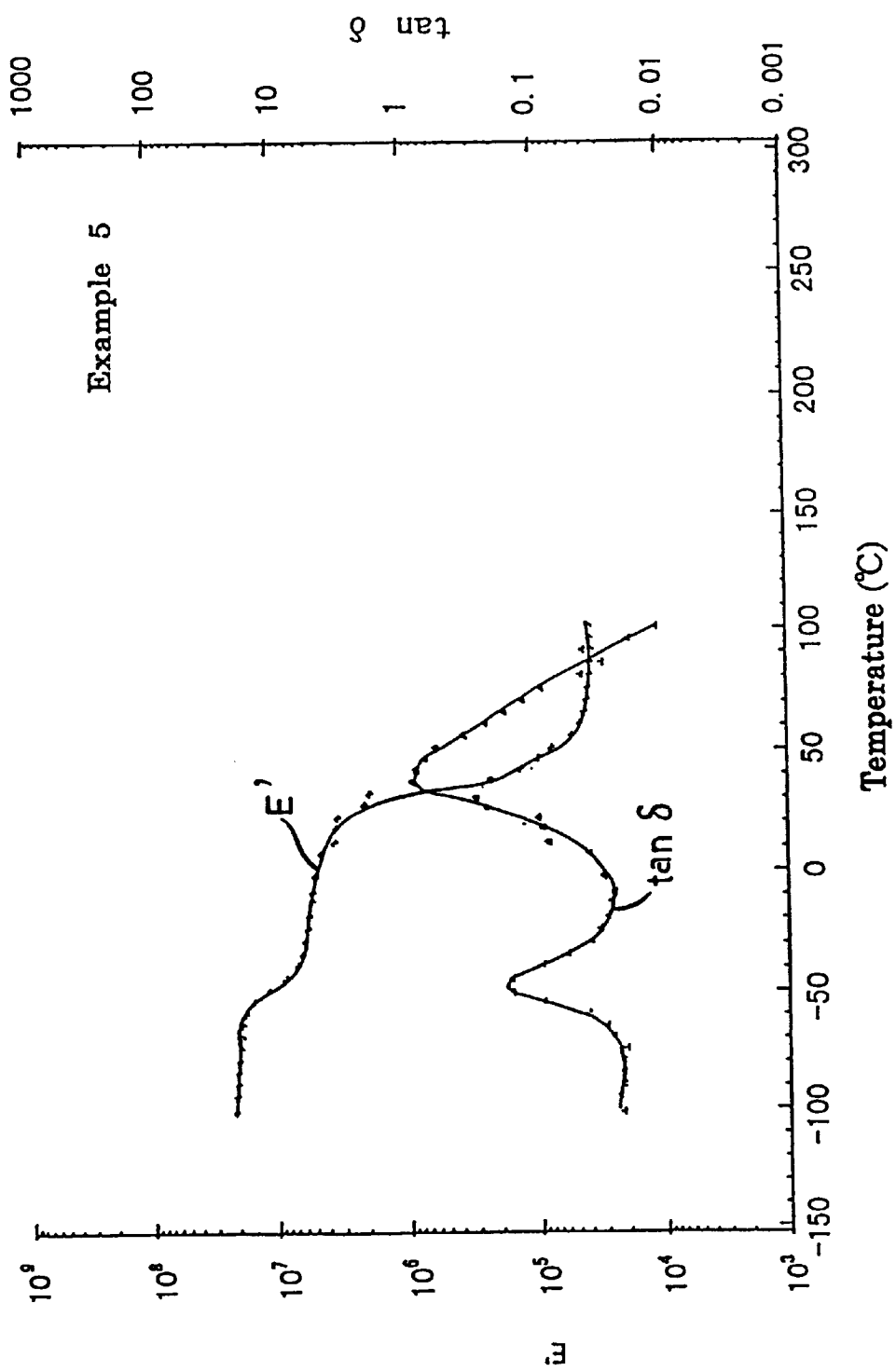
FIG. 5 shows a measurement result for viscoelasticity of Example 5.
Figure 6:
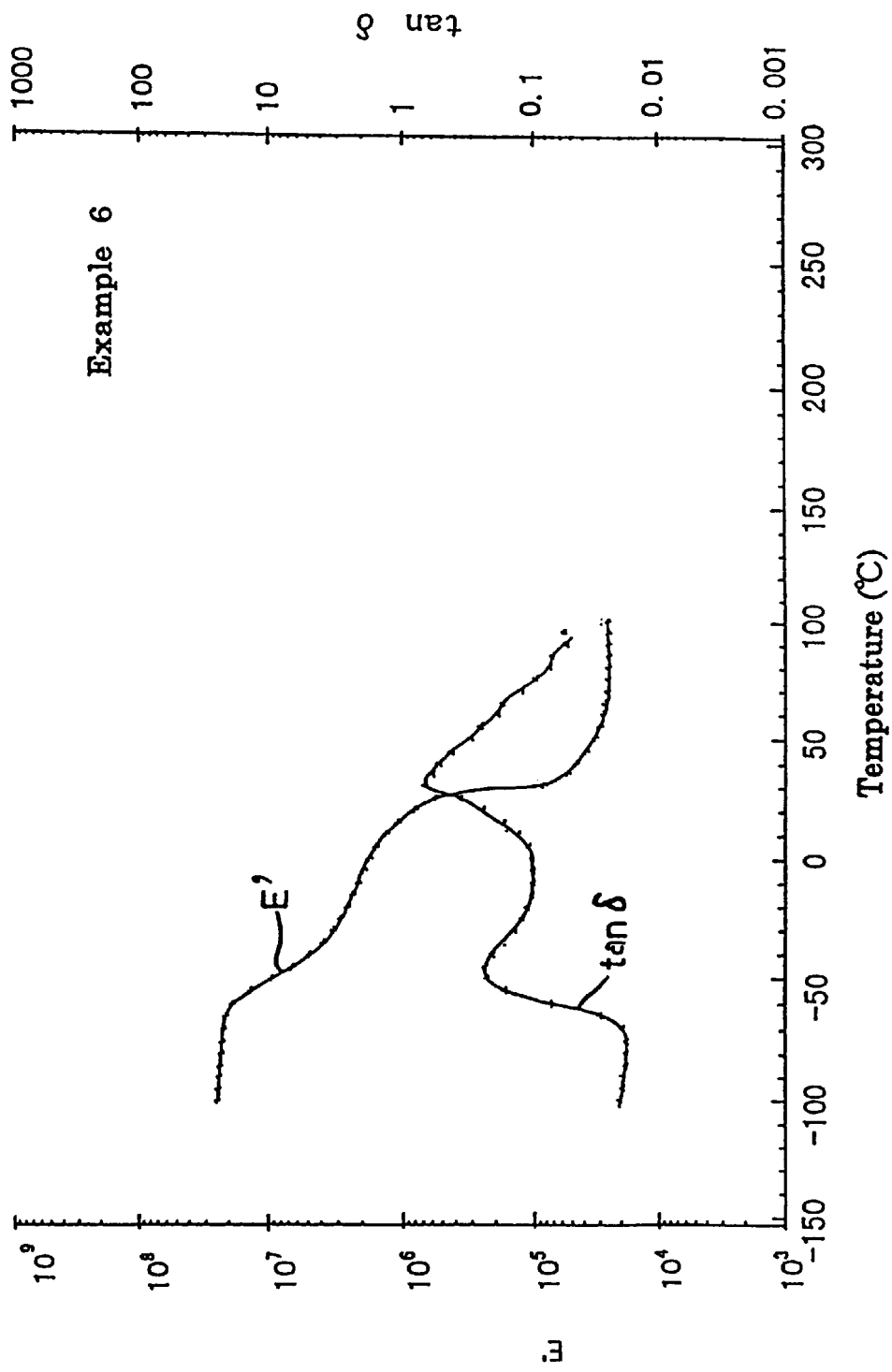
FIG. 6 shows a measurement result for viscoelasticity of Example 6.
Figure 7:
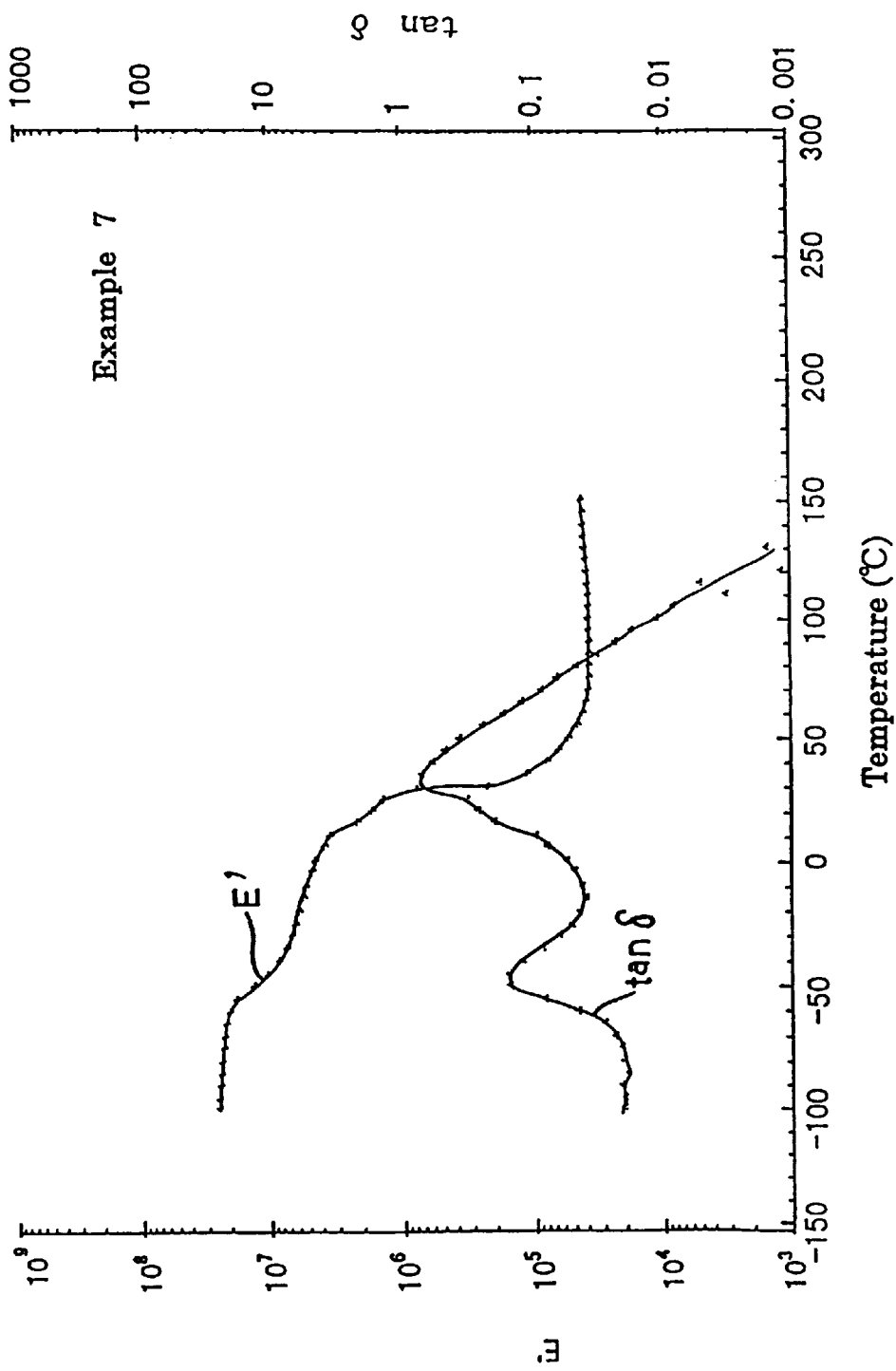
FIG. 7 shows a measurement result for viscoelasticity of Example 7.

Low resilience urethane foam according to the present invention is produced by reaction of the urethane foam compositions comprising polyol (a), polyisocyanate (b), catalyst (c) and blowing agent (d).

Polyols for usual use in producing urethane foams may be used as the polyol (a) used in the present invention. The polyol is properly selected for use such that the produced urethane foam can have at least one glass transition point in each of the temperature range of −70° C. to −20° C. and the temperature range of 0° C. to 60° C.

It is preferable that the polyol (a) is at least one polyol selected from the group consisting of polyoxyalkylene polyol, vinyl polymer-containing polyoxyalkylene polyol, polyester polyol, and polyoxyalkylene polyester block copolymer polyol.

The polyoxyalkylene polyols include those in which alkylene oxides are added to initiators such as water, alcohol, amine and ammonia. The alcohol that may be used as the initiator includes monohydric or polyhydric alcohol including monohydric alcohol such as methanol and ethanol; dihydric alcohol such as ethylene glycol and propylene glycol; trihydric alcohol such as glycerin and trimethylolpropane; tetrahydric alcohol such as pentaerythritol; hexahydric alcohol such as sorbitol; and octahydric alcohol such as saccharose. The amines that may be used as the initiator include monofunctional or polyfunctional amines including monofunctional amines such as dimethylamine and diethylamine; bifunctional amines such as methylamine and ethylamine; trifunctional amines such as monoethanolamine, diethanolamine and triethanolamine; tetrafunctional amines such as ethylenediamine; and pentafunctional amines such as diethylenetriamine. Of these initiators, monohydric to hexahydric alcohol and monofunctional to pentafunctional amines may be cited as preferable initiators.

The alkylene oxides that may be used include, for example, ethylene oxide, propylene oxide, 1,2-, 1,3-, 1,4- and 2,3-butylene oxides and combinations of two or more thereof. Of these alkylene oxides, propylene oxide and/or ethylene oxide may be cited as preferences. When used in combination, they may take either of the block addition and the random addition, preferably the block addition.

The vinyl polymer-containing polyoxyalkylene polyols that may be used include those in which vinyl monomers, such as acrylonitrile and styrene, are polymerized and stably dispersed in the polyoxyalkylene polyol cited above in the presence of radicals. The content of the vinyl polymer in the polyoxyalkylene polyol is usually 15 weight percent to 45 weight percent.

The polyester polyols that may be used include those obtained by condensation polymerization of one or two or more compounds having two or more hydroxyl groups including, for example, ethylene glycol, diethylene glycol, triethylene glycol, 1,2-propylene glycol, trimethylene glycol, 1,3- or 1,4-butylene glycol, hexamethylene glycol, decamethylene glycol, glycerin, trimethylolpropane, pentaerythritol and sorbitol and one or two or more compounds having two or more carboxyl groups including, for example, adipic acid, succinic acid, malonic acid, maleic acid, tartaric acid, pimelic acid, sebacic acid, phthalic acid, terephthalic acid, isophthalic acid and trimellitic acid; and those obtained by ring opening polymerization of ε-caprolactone or the like.

The polyoxyalkylene polyester block copolymer polyols that may be used include those having the structure of polyoxyalkylene polyol being blocked by a polyester chain, as disclosed by, for example, JP Patent Publication No. Sho 48(1973)-10078, or in which the part to be substituted by hydrogen atoms of hydroxyl groups of the polyoxyalkylene polyol or of the derivative having hydroxyl groups is expressed by a general formula (1) given below.

$$+(CO-R_1-COO-R_2-O)_nH \quad (1)$$

(Where $R_1$ and $R_2$ are bivalent hydrocarbon and n is a number larger than 1 in average). In the general formula (1), bivalent hydrocarbon residues expressed by $R_1$ include, for example, saturated aliphatic or aromatic polycarboxylic acid residues; bivalent hydrocarbon residues expressed by $R_2$ include, for example, residues resulting from cleavage of compounds having cyclic ether groups; and n is preferably the number ranging from 1 to 20. The polyoxyalkylene polyester block copolymer polyols are obtained by allowing polycarboxylic anhydride and alkylene oxide to react with polyoxyalkylene polyol.

It is preferable that the polyol (a) used in the present invention comprises polyol (a-1) of 1.5 to 4.5 in average functionality and 20–70 mgKOH/g in hydroxyl value, preferably 30–60 mgKOH/g in hydroxyl value, and polyol (a-2) of 1.5 to 4.5 in average functionality and 140–300 mgKOH/g in hydroxyl value, preferably 200–270 mgKOH/g in hydroxyl value. With the average functionality of less than 1.5, physical properties of the urethane foam obtained, such as dry heat permanent set (compression set), sometimes may deteriorate drastically. With the average functionality of more than 4.5, the urethane foam obtained will have reduced stretchability and increased hardness and as a result, the physical properties, such as tensile strength, sometimes may deteriorate. With the polyols comprising polyol (a-1) of 20–70 mgKOH/g and polyol (a-2) of 140–300 mgKOH/g which are different in hydroxyl value from each other, the urethane foam obtained can be given a glass transition point in each of the temperature range of −70° C. to −20° C. and the temperature range of 0° C. to 60° C. with ease.

Further, it is preferable that the polyol (a) contains therein the polyol (a-1) in the range of 32–80 weight percent and the polyol (a-2) in the range of 20–68 weight percent. With the polyol (a-1) of less than 32 weight percent, in other words, with the polyol (a-2) of more than 68 weight percent, the tan δ peak of the urethane foam obtained will be less than 0.15 in the temperature range of −70° C. to −20° C., so that the hardness at room temperature sometimes may increase. On the other hand, with the polyol (a-1) of more than 80 weight percent, in other words, with the polyol (a-2) of less than 20 weight percent, the tan δ peak of the urethane foam obtained will be less than 0.3 in the temperature range of 0° C. to 60° C., so that the impact resilience at room temperature sometimes may increase. Further, it is preferable that the polyol (a) contains therein the polyol (a-1) in the range of 34–75 weight percent and the polyol (a-2) in the range of 25–66 weight percent.

It is preferable that the polyol (a-1) comprises polyoxyalkylene polyol and polyoxyalkylene polyester block copolymer polyol. The polyol (a-1) comprising polyoxyalkylene polyol and polyoxyalkylene polyester block copolymer polyols enables the impact resilience of the urethane foam obtained to be reduced. The polyol (a-1) should then preferably contain therein the polyoxyalkylene polyol and polyoxyalkylene polyester block copolymer polyol in the range of 30–70 weight percent, respectively, in the range of which the effect of reducing the impact resiliency is most produced.

It is preferable that the polyol (a-2) is polyoxyalkylene polyol in which an oxyethylene unit is contained in the oxyalkylene unit. Where the polyol (a-2) is polyoxyalkylene polyol in which the oxyethylene unit is contained in the oxyalkylene unit, the urethane foam obtained can be given the glass transition point in each of the temperature range of –70° C. to –20° C. and the temperature range of 0° C. to 60° C. with further ease. It is then preferable that 20 weight percent or more, further preferably 60 weight percent or more, of oxyethylene unit is contained in the oxyalkylene unit. The increase of oxyethylene unit contained in oxyalkylene unit enables the impact resiliency to be reduced further.

An interrelation of the molecular weight, the functionality and the hydroxyl value of the polyol is expressed by the following fomula given below.

$$\text{Molecular weight} = \frac{\text{Functionality} \times 56{,}100}{\text{Hydroxyl value}}$$

Known polyisocyanates in usual use for producing the urethane foam may be used as the polyisocyanate (b) used in the present invention. The polyisocyanates which may be used include aromatic polyisocyanates such as 2,4- or 2,6-tolylene diisocyanate (TDI), diphenylmethane diisocyanate (MDI), phenylene diisocyanate (PDI) and naphthalene diisocyanate (NDI); aromatic aliphatic polyisocyanates such as 1.3- or 1,4-xylylene diisocyanate (XDI); aliphatic polyisocyanates such as hexamethylene diisocyanate (HDI); cycloaliphatic polyisocyanates such as 3-isocyanatomethyl-3,5,5-trimethylcyclohexyl isocyanate (IPDI), 4-4'-methylene-bis (cyclohexyl isocyanate) ($H_{12}$MDI), 1,3- or 1,4-bis (isocyanatomethyl) cyclohexane ($H_6$XDI) and modified polyisocyanates thereof including carbodiimides, biurets, allophanates, dimers, trimers or polymethylene polyphenyl polyisocyanates (crude MDI, polymeric MDI). These may be used singly or in combinations of two or more polyisocyanates. Of these polyisocyanates, the aromatic polyisocyanates are of preferable and the TDI is of further preferable.

Known catalysts in usual use for producing the urethane foam may be used as the catalyst (c) used in the present invention. The catalysts that may be used include (i) amine catalysts including tertiary amines, such as triethylamine, triethylenediamine and N-methylmorpholine; quaternary ammonium salts, such as tetraethylhydroxyl ammonium; and imidazoles, such as imidazole and 2-ethyl-4-methylimidazole and (ii) organic metal catalysts including organic tin compounds, such as tin acetate, tin octylate, dibutyltin dilaurate and dibutyltin chloride; organic lead compounds such as lead octylate and lead naphthenate; and organic nickel compounds such as nickel naphthenate. Of these catalysts, a combination of the amine catalyst and the organic metal catalyst is preferable, and particularly preferable is the combination of the tertiary amine and the organic tin compound.

Known blowing agents in usual use for producing the urethane foam may be used as the blowing agent (d) used in the present invention. The blowing agents that may be used include water and/or halogen substituted aliphatic hydrocarbon blowing agents such as trichlorofluoromethane, dichlorodifluoromethane, trichloroethane, trichloroethylene, tetrachloroethylene, methylene chloride, trichlorotrifluoroethane, dibromotetrafluoroethane and carbon tetrachloride. These blowing agents may be used in combinations of two or more, while in the present invention water is preferably used alone.

The urethane foam compositions of the present invention may include foam stabilizer, flame retardant and other additives, in addition to the components mentioned above, if needed. Known foam stabilizers in usual use for producing the urethane foam, such as siloxane-oxyalkylene block copolymer, may be used as the foam stabilizer used in the present invention. An example thereof is F-242T available from Shin-Etsu Chemical Co., Ltd. Also, known flame retardants in usual use for producing the urethane foam may be used as the flame retardant used in the present invention, such as condensed phosphate (an example thereof is CR-504 available from Daihachi Chemical Industry Co., Ltd.) and trischloroisopropyl phosphate (an example thereof is FYROL PCF available from Akzo Kashima Limited). Other additives that may be used include, for example, known colorant, plasticizer, antioxidant and ultravoilet absorber in usual use for producing the urethane foams.

No particular limitation is imposed on the formulating proportion of the components of the urethane foam composition including polyol (a), polyisocyanate (b), catalyst (c) and blowing agent (d), as long as the components are formulated in such a proportion as to allow the low resilience urethane foam to be produced by the foaming of the urethane foam compositions. For example, 0.01–5 parts by weight, preferably 0.2–3 parts by weight, of the catalyst (c); 0.5–4.5 parts by weight, preferably 0.8–3.5 parts by weight, of water; and 0.1–4 parts by weight, preferably 0.4–2.0 parts by weight, of the foam stabilizer (e), if formulated; and not more than 20 parts by weight, preferably not more than 15 parts by weight, of the flame retardant, if formulated, are formulated to 100 parts by weight of the polyol (a). The polyisocyanate (b), when formulated, is formulated in such a proportion that the isocyanate index can reach e.g. 75–125, preferably 85–115.

To obtain the low resilience urethane foam, the urethane foam compositions may be foamed in the abovesaid proportion in known foaming methods, such as a slabbing method, a molding method and a spraying method.

The low resilience urethane foam of the present invention thus obtained has at least one glass transition point in each of the temperature range of –70° C. to –20° C., preferably –50° C. to –25° C., and the temperature range of 0° C. to 60° C., preferably 30° C. to 55° C. It is noted here that "the glass transition point" used herein indicates the temperature at which the glass transition of the urethane foam from a glassy state to a rubbery state is caused. In the present invention, the tan δ peak obtained when measurement on dynamic viscoelasticity is carried out at a frequency of 10 herz is preferably expressed as the glass transition point.

Where the tan δ peak is set as the glass transition point, the low resilience urethane foam of the present invention has at least one tan δ peak of 0.15 or more, preferably 0.18 or more, in the temperature range of –70° C. to –20° C. and at least one tan δ peak of 0.3 or more, preferably 0.48 or more, in the temperature range of 0° C. to 60° C. Unless the glass transition point exists in each of the temperature range of −70° C. to −20° C. and the temperature range of 0° C. to 60° C. and the tan δ peak of the glass transition point is 0.15 or more in the range of −70° C. to −20° C. and the tan δ peak of the glass transition point is 0.3 or more in the range of 0° C. to 60° C., the hardness of the urethane foam will increase at low temperature and no excellent low resiliency will be produced at room temperature.

It is desirable that the low resilience urethane foam of the present invention has a given tan δ peak(s) in each of the two temperature ranges described above. Two or more tan δ peaks may exist in a temperature range. The at least one tan δ peak in the temperature range of −70° C. to −20° C. is preferably in the range of 0.15–0.5, and the at least one tan δ peak in the temperature range of 0° C. to 60° C. is preferably in the range of 0.3–1.0.

A storage modulus (E') of the low resilience urethane foam of the present invention, which is obtained together with the tan δ peak when the measurement on the dynamic viscoelasticity is carried out at the frequency of 10 herz, is preferably not more than 5 MPa at temperature of not less than 0° C., further preferably not more than 5 MPa at temperature of not less than −20° C. The storage modulus (E') of not more than 5 Mpa provides only a small increase in hardness, and the storage modulus (E') of not more than 5 MPa at not less than 0° C., further at not less than −20° C. can ensure the use range of the urethane foam even at lower temperatures and thus enables the urethane foam to be effectively used even in a cold area.

Further, it is preferable that the storage modulus (E') at −20° C. is in the range of less than 40%, preferably less than 25%, of the storage modulus (E') at −100° C. With the storage modulus (E') at −20° C. is more than 40%, the urethane foam sometimes may become rigid like a stone.

The low resilience urethane foam of the present invention, usually having a density of 0.010 g/cm³ to 0.8 g/cm³, has an excellent low resilience of an impact resilience modulus of not more than 20% at 25° C. and yet enables the hardness not to increase so much even at low temperatures. Therefore, the low resilience urethane foam of the present invention can be used effectively as the impact energy absorbing material, the sound insulating material, the vibration damping material and the cushioning material for chairs and mattresses even in a low temperature range.

EXAMPLES

With reference to examples and comparative examples, the present invention directed to low resilience urethane foam will be concretely described below. It is to be understood, however, that the scope of the present invention is by no means limited to the illustrated examples.

1) Raw material

The following raw materials were used.

Polyol (a):

(1) Polyoxyalkylene polyester block copolymer polyol, Average functionality of about 3, and Hydroxyl value of 56 mgKOH/g;

(2) Polyoxyalkylene polyol, Average functionality of about 3, Hydroxyl value of 34 mgKOH/g, and 100 weight percent oxypropylene content for oxyalkylene moiety;

(3) Polyoxyalkylene polyol, Average functionality of about 3, Hydroxyl value of 250 mgKOH/g, 30 weight percent oxypropylene content for oxyalkylene moiety, and 70 weight percent oxyethylene content for oxyalkylene moiety;

(4) Polyoxyalkylene polyol, Average functionality of about 3, Hydroxyl value of 250 mgKOH/g, and 100 weight percent oxypropylene content for oxyalkylene moiety;

(5) Polyoxyalkylene polyol, Average functionality of about 2, Hydroxyl value of 105 mgKOH/g, and 100 weight percent oxyethylene content for oxyalkylene moiety;

(6) Polyoxyalkylene polyol, Average functionality of about 3, Hydroxyl value of 250 mgKOH/g, 60 weight percent oxypropylene content for oxyalkylene moiety, and 40 weight percent oxyethylene content for oxyalkylene moiety;

(7) Polyoxyalkylene polyol, Average functionality of about 3, Hydroxyl value of 100 mgKOH/g, and 100 weight percent oxypropylene content for oxyalkylene moiety;

(8) Polyoxyalkylene polyol, Average functionality of about 3, Hydroxyl value of 250 mgKOH/g, 85 weight percent oxypropylene content for oxyalkylene moiety, and 15 weight percent oxyethylene content for oxyalkylene moiety;

(9) Polyoxyalkylene polyol, Average functionality of about 3, Hydroxyl value of 210 mgKOH/g, 70 weight percent oxypropylene content for oxyalkylene moiety, and 30 weight percent oxyethylene content for oxyalkylene moiety;

(10) Polyoxyalkylene polyol, Average functionality of about 3, Hydroxyl value of 160 mgKOH/g, 85 weight percent oxypropylene content for oxyalkylene moiety, and 15 weight percent oxyethylene content for oxyalkylene moiety; and

(11) Polyoxyalkylene polyol, Average functionality of about 4, Hydroxyl value of 180 mgKOH/g, 70 weight percent oxypropylene content for oxyalkylene moiety, and 30 weight percent oxyethylene content for oxyalkylene moiety.

Polyisocyanate (b):

Toluene diisocyanate (a mixture of 2,4-isomer of 80 weight percent and 2,6-isomer of 20 weight percent) (Takenate T-80 available from Takeda Chemical Industries, Ltd.);

Catalyst (c):

(1) Bis(2-dimethylaminoethyl) ether/dipropylene glycol) (70% solution) (TOYOCAT ET available from TOSOH CORPORATION);

(2) Bis(2-dimethylaminoethyl) ether/dipropylene glycol) (70% solution) (NIAX A-1 available from Witco Corporation);

(3) Tin Octylate (STANOCT available from YOSHI-TOMI FINE CHEMICALS, LTD.) (4) Tin Octylate (DABCO T-9 available from Air Products and Chemicals, Inc.)

Blowing agent (d):

Water (Demineralized water)

Foam stabilizer (e):

Siloxane-oxyalkylene block copolymer foam stabilizer (F-242T available from Shin-Etsu Chemical Co., Ltd.)

Flame retardant (f):

(1) Condensed phosphate ester (CR-504 available from Daihachi Chemical Industry Co., Ltd.); and (2) Trischloroisopropyl phosphate (FYROL PCF available from Akzo Kashima Limited).

2) Production of urethane foams of Examples and Comparative Examples:

Components and proportions of the urethane foam compositions of Examples 1–7 and Comparative Examples 1–14 are shown in TABLES 1 and 2. The proportions of the components of all the urethane foam compositions shown in TABLES 1 and 2 are expressed by parts by weight, except for the isocyanate index.

TABLE 1

| Urethane foam compositions | Examples | | | | | | |
|---|---|---|---|---|---|---|---|
| | 1 | 2 | 3 | 4 | 5 | 6 | 7 |
| Polyol (a)(1) | 40 | 40 | 40 | — | — | — | — |
| Polyol (a)(2) | 30 | 30 | 30 | 40 | 35 | 40 | 35 |
| Polyol (a)(3) | 30 | 30 | — | — | — | — | — |
| Polyol (a)(4) | — | — | — | — | — | — | — |
| Polyol (a)(5) | — | — | — | — | — | — | — |
| Polyol (a)(6) | — | — | 30 | — | — | — | — |
| Polyol (a)(7) | — | — | — | — | — | — | — |
| Polyol (a)(8) | — | — | — | — | — | — | — |
| Polyol (a)(9) | — | — | — | 60 | 65 | — | — |
| Polyol (a)(10) | — | — | — | — | — | 15 | 16.25 |
| Polyol (a)(11) | — | — | — | — | — | 45 | 48.75 |
| Catalyst (c)(1) | 0.3 | 0.3 | 0.3 | 0.2 | 0.3 | — | — |
| Catalyst (c)(2) | — | — | — | — | — | 0.3 | 0.3 |
| Catalyst (c)(3) | 0.08 | 0.08 | 0.08 | 0.08 | 0.08 | — | — |
| Catalyst (c)(4) | — | — | — | — | — | 0.1 | 0.05 |
| Blowing agent (d) Water | 1.5 | 2 | 1.5 | 1.5 | 1.5 | 1.5 | 1.5 |
| Foam stabilizer (e) F-242T | 1 | 1 | 1 | 1 | 1 | 1 | 1 |
| Flame Retardant (f)(1) | 12 | 12 | 12 | 12 | 12 | — | — |
| Flame Retardant (f)(2) | — | — | — | — | — | — | — |
| Polyisocyanate (b) | 31.2 | 36 | 31.2 | 36.2 | 37.5 | 32.9 | 34.0 |
| Isocyanate Index | 100 | 100 | 100 | 100 | 100 | 100 | 100 |
| Cream time (sec.) | 12 | 11 | 13 | 10 | 11 | 10 | 10 |
| Risetime sec. | 125 | 120 | 127 | 115 | 116 | 127 | 126 |
| Density (kg/m$^3$) | 59.0 | 50.0 | 59.2 | 60.1 | 61.3 | 49.9 | 53.9 |
| 25% ILD Hardness (kg/314 cm$^2$) | 3.2 | 5.4 | 3.6 | 4.5 | 22.6 | 9.6 | 10.2 |
| Ball Rebound (%) | 8 | 14 | 11 | 18 | 16 | 9 | 5 |
| Compression Set % | 1.2 | 4.2 | 1.8 | 1.1 | 1.3 | 1.2 | 0.7 |
| Tensile Strength (kg/cm$^2$) | 0.52 | 0.50 | 0.60 | 0.66 | 0.71 | 0.85 | 1.01 |
| Elongation (%) | 179 | 165 | 160 | 162 | 157 | 165 | 159 |
| Tear Strength (kg/cm) | 0.36 | 0.35 | 0.32 | 0.35 | 0.52 | 0.71 | 0.66 |
| Glass Transition Point 1 Peak Temp. (° C.) | −32 | −38 | −30 | −45 | −49 | −48 | −47 |
| Glass Transition Point 1 tan δ peak | 0.30 | 0.20 | 0.29 | 0.30 | 0.16 | 0.22 | 0.16 |
| Glass Transition Point 2 Peak Temp. (° C.) | 36 | 52 | 34 | 42 | 38 | 32 | 33 |
| Glass Transition Point 2 tan δ peak | 0.52 | 0.50 | 0.50 | 0.51 | 0.9 | 0.65 | 0.72 |
| tan δ peak at 25° C. | 0.32 | 0.21 | 0.37 | 0.21 | 0.16 | 0.40 | 0.45 |
| E'(−100° C.)(MPa) | 24 | 20 | 24 | 40 | 20 | 24 | 25 |
| E'(−20° C.)(MPa) | 2.1 | 3.1 | 3.5 | 3 | 5 | 2.5 | 5.8 |
| E'(−20° C.)/E'(−100° C.) × 100(%) | 8.8 | 15.5 | 14.6 | 7.5 | 25 | 10.4 | 23.2 |
| E'(25° C.)(MPa) | 0.26 | 0.7 | 0.3 | 0.6 | 2.0 | 0.6 | 0.9 |

TABLE 2

| Urethane foam compositions | Comparative Examples | | | | | | | | | | | | | |
|---|---|---|---|---|---|---|---|---|---|---|---|---|---|---|
| | 1 | 2 | 3 | 4 | 5 | 6 | 7 | 8 | 9 | 10 | 11 | 12 | 13 | 14 |
| Polyol (a)(1) | 30 | 30 | 30 | 40 | — | 40 | 20 | — | — | — | — | — | — | — |
| Polyol (a)(2) | — | — | — | 30 | — | 30 | — | 85 | 30 | 100 | 75 | 50 | 30 | — |
| Polyol (a)(3) | 60 | 60 | 60 | — | — | — | — | — | — | — | — | — | — | — |
| Polyol (a)(4) | 10 | 10 | 10 | 30 | — | — | — | — | — | — | — | — | — | — |
| Polyol (a)(5) | — | — | — | — | 30 | — | — | — | — | — | — | — | — | — |
| Polyol (a)(6) | — | — | — | — | 70 | — | — | — | — | — | — | — | — | — |
| Polyol (a)(7) | — | — | — | — | — | 30 | 80 | 15 | 70 | — | — | — | — | — |
| Polyol (a)(8) | — | — | — | — | — | — | — | — | — | — | — | — | — | — |
| Polyol (a)(9) | — | — | — | — | — | — | — | — | — | — | — | — | — | 25 |
| Polyol (a)(10) | — | — | — | — | — | — | — | — | — | — | 6.25 | 12.5 | 17.5 | 75 |
| Polyol (a)(11) | — | — | — | — | — | — | — | — | — | — | 18.75 | 37.5 | 52.5 | — |
| Catalyst (c)(1) | 0.2 | 0.2 | 0.2 | 0.25 | 0.3 | 0.3 | 0.3 | 0.3 | 0.3 | 0.3 | 0.3 | 0.3 | 0.3 | 0.3 |
| Catalyst (c)(2) | 0.02 | 0.02 | 0.02 | 0.06 | 0.08 | 0.08 | 0.08 | 0.08 | 0.08 | — | — | — | — | — |
| Catalyst (c)(3) | — | — | — | — | — | — | — | — | — | 0.2 | 0.5 | 0.1 | 0.05 | 0.1 |
| Catalyst (c)(4) | 1.8 | 1.8 | 1.8 | 3 | 1.5 | 1.5 | 1.5 | 1.5 | 1.5 | 1.5 | 1.5 | 1.5 | 1.5 | 1.5 |
| Blowing agent (d) Water | 1 | 1 | 1 | 1 | 1 | 1 | 1 | 1 | 1 | 1 | 1 | 1 | 1 | 1 |
| Foam stabilizer (e) F-242T | — | — | — | — | — | — | — | — | — | — | — | — | — | — |
| Flame Retardant (f)(1) | 3 | 3 | 3 | — | — | 12 | 12 | 12 | 12 | — | — | — | — | — |
| Flame Retardant (f)(2) | — | — | — | — | — | — | — | — | — | — | — | — | — | — |
| Polyisocyanate (b) | 40.4 | 42.6 | 44.9 | 45.7 | 37.0 | 31.2 | 41.6 | 23.9 | 38.9 | 19.8 | 25.3 | 30.7 | 35.1 | 41.7 |
| Isocyanate Index | 90 | 95 | 100 | 100 | 100 | 100 | 100 | 100 | 100 | 100 | 100 | 100 | 100 | 100 |
| Cream time (sec.) | 14 | 13 | 12 | 12 | 11 | 14 | 12 | 14 | 12 | 11 | 10 | 10 | 10 | 10 |
| Rise time (sec.) | 189 | 177 | 155 | 196 | 130 | 131 | 122 | 152 | 120 | 140 | 99 | 120 | 127 | 73 |
| Density (kg/m³) | 44.5 | 44.2 | 44.3 | 39.9 | 55.6 | 59.4 | 63.2 | 55.5 | 63.1 | 67.6 | 52.0 | 51.5 | 50.4 | 56.4 |
| 25% ILD Hardness (kg/314 cm²) | 3.6 | 7.6 | 24.4 | 15.2 | 3.1 | 12.2 | 38.1 | 4.2 | 41.2 | 5.1 | 5.2 | 6.1 | 12.6 | 20.2 |
| Ball Rebound (%) | 2 | 4 | 6 | 13 | 24 | 13 | 18 | 45 | 16 | 38 | 18 | 12 | 4 | 3 |
| Compression Set (%) | 0.4 | 0.3 | 0.2 | 5.3 | 6.7 | 3.4 | 1.9 | 7.2 | 1.4 | 9.4 | 4.5 | 2.6 | 0.7 | 0.4 |
| Tensile Strength (kg/cm²) | 0.33 | 0.62 | 1.09 | 1.12 | 0.62 | 0.82 | 1.04 | 0.66 | 0.82 | 0.51 | 0.62 | 0.81 | 1.10 | 1.21 |
| Elongation (%) | 180 | 170 | 168 | 155 | 172 | 162 | 162 | 158 | 158 | 180 | 178 | 178 | 171 | 162 |
| Tear Strength (kg/cm) | 0.31 | 0.57 | 1.07 | 0.66 | 0.36 | 0.82 | 0.92 | 0.38 | 0.73 | 0.46 | 0.49 | 0.53 | 0.65 | 0.72 |
| Glass Transition Point 1 Peak Temp. (°C.) | 32 | 36 | 40 | 26 | 3 | 23 | −45 | −50 | −50 | −44 | −40 | −40 | −50 | — |
| tan δ peak | 0.90 | 0.92 | 0.90 | 0.31 | 0.76 | 0.3 | 0.08 | 0.88 | 0.12 | 0.85 | 0.70 | 0.40 | 0.11 | — |
| Glass Transition Point 2 Peak Temp. (°C.) | — | — | — | — | — | — | 41 | 56 | 38 | — | — | 43 | 30 | 30 |
| tan δ peak | — | — | — | — | — | — | 0.69 | 0.09 | 1.0 | — | — | 0.26 | 0.9 | 0.98 |

TABLE 2-continued

| Urethane foam compositions | Comparative Examples | | | | | | | | | | | | | |
|---|---|---|---|---|---|---|---|---|---|---|---|---|---|---|
| | 1 | 2 | 3 | 4 | 5 | 6 | 7 | 8 | 9 | 10 | 11 | 12 | 13 | 14 |
| tan δ peak at 25° C. | 0.80 | 0.50 | 0.30 | 0.31 | 0.12 | 0.30 | 0.46 | 0.07 | 0.2 | 0.11 | 0.16 | 0.20 | 0.60 | 0.85 |
| E'(−100° C.)(MPa) | 26 | 27 | 18 | 10 | 22 | 24 | 25 | 22 | 26 | 47 | 28 | 17 | 21 | 28 |
| E'(−20° C.)(MPa) | 18 | 20 | 12 | 4.0 | 16 | 10 | 13 | 0.7 | 10 | 0.27 | 0.23 | 0.37 | 7.6 | 20 |
| E'(−20° C.)/E' (−100° C.) × 100(%) | 69.2 | 74.0 | 66.7 | 40.0 | 73.7 | 41.7 | 52 | 3.2 | 38.5 | 0.57 | 0.82 | 2.2 | 36 | 71 |
| E'(25° C.)(MPa) | 0.70 | 2.3 | 3.3 | 0.33 | 0.5 | 0.71 | 2.1 | 0.3 | 14.1 | 0.14 | 0.045 | 0.075 | 0.6 | 0.85 |

Except for the catalyst (c)(3) or the catalyst (c)(4) and polyisocyanate (b), the compounds of Examples and Comparative Examples shown in TABLES 1 and 2 were all mixed with a hand mixer and the catalyst (c)(3) or the catalyst (c)(4) was then added thereto and stirred for 5 seconds. Immediately thereafter, the polyisocyanate (b) was added to and mixed in the mixtures in accordance with the isocyanate indexes shown in TABLES 1 and 2. The resultant mixtures were poured into foam boxes to be foamed and cured. The urethane foams thus produced were allowed to stand for one day at room temperature and thereafter their physical properties were measured.

3) Methods of measurement on the physical properties:

Measurements on the physical properties of the obtained urethane foams of Examples and Comparative Examples were performed in accordance with the methods below. The results are shown in TABLES 1 and 2.

(a) Measurements on Density, Ball rebound, and Hardness (25% ILD) were measured in accordance with JIS (Japanese Industrial Standard) K 6401.

(b) Measurements on Compression set (Residual set after compression to 50% of the thickness at 70° C. for 22 hours) were performed in accordance with JIS K 6382.

(c) Measurements on Tensile strength and Elongation were performed in accordance with JIS K 6402.

(d) Measurements on Tear strength were performed in accordance with JIS K 6767.

(e) Dynamic viscoelasticity tests were performed using rectangular parallelopiped specimens of a length of 2.0 cm and a section of 2.0×1.0 cm and the measurements thereon were performed by use of VISCO ELASTIC SPECTROMETER (VES-F-III, Iwamoto Seisakusho Co., Ltd.) with a temperature elevation rate of 3° C./min., a frequency of 10 herz and a vibration amplitude of ±0.01 mm. The tan δ peak, the storage modulus (E') and others were determined from the obtained data.

Evaluation on the hardness of Examples 6 and 7 and Comparative Examples 10–14 was made by contact finger at every 10° C. in the range from −50° C. to 20° C. The results are shown in TABLE 3. In TABLE 3, "S", "H" and "F" indicate "Stone-like rigid", "High load bearing flexible" and "Flexible", respectively.

TABLE 3

| Examples Comparative | Temperature (° C.) | | | | | | | |
|---|---|---|---|---|---|---|---|---|
| Examples | −50 | −40 | −30 | −20 | −10 | 0 | 10 | 20 |
| Compar. Ex. 10 | S | F | F | F | F | F | F | F |
| Compar. Ex. 11 | S | F | F | F | F | F | F | F |
| Compar. Ex. 12 | S | H | F | F | F | F | F | F |
| Example 6 | S | H | H | F | F | F | F | F |
| Example 7 | S | S | S | S | S | H | H | F |
| Compar. Ex. 13 | S | S | S | S | S | S | H | F |
| Compar. Ex. 14 | S | S | S | S | S | S | S | H |

4) Measurement results:

Measurement results on the viscoelasticity of the urethane foams of Examples 1–7 and Comparative Examples 1–14 are shown in FIGS. 1–21, respectively. Of these figures, for example FIG. 1, representing the measurement result on the viscoelasticity of the urethane foam of Example 1, shows the tan δ curve having two peaks of 0.30 and 0.52 at −32° C. and 36° C., respectively, and the storage modulus (E') curve, obtained together with the tan δ curve, in which the glass transition range drops sharply from around −50° C. to around −30° C.; then drops mildly from around −30° C. to around 0° C. for a while; and then drops again sharply from around 0° C. to around 40° C. into the rubbery range.

Figure 8:
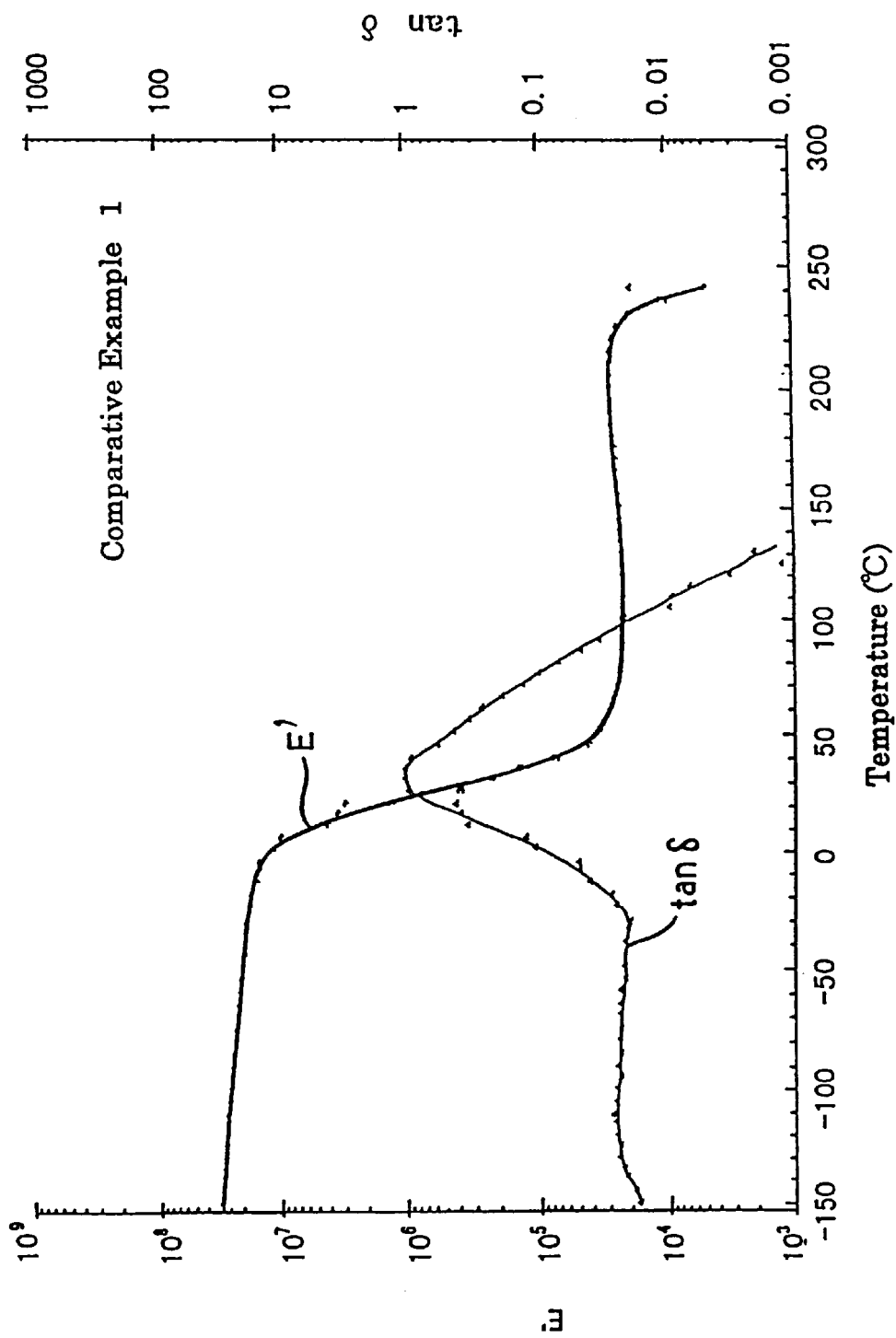
FIG. 8 shows a measurement result for viscoelasticity of Comparative Example 1.
Figure 9:
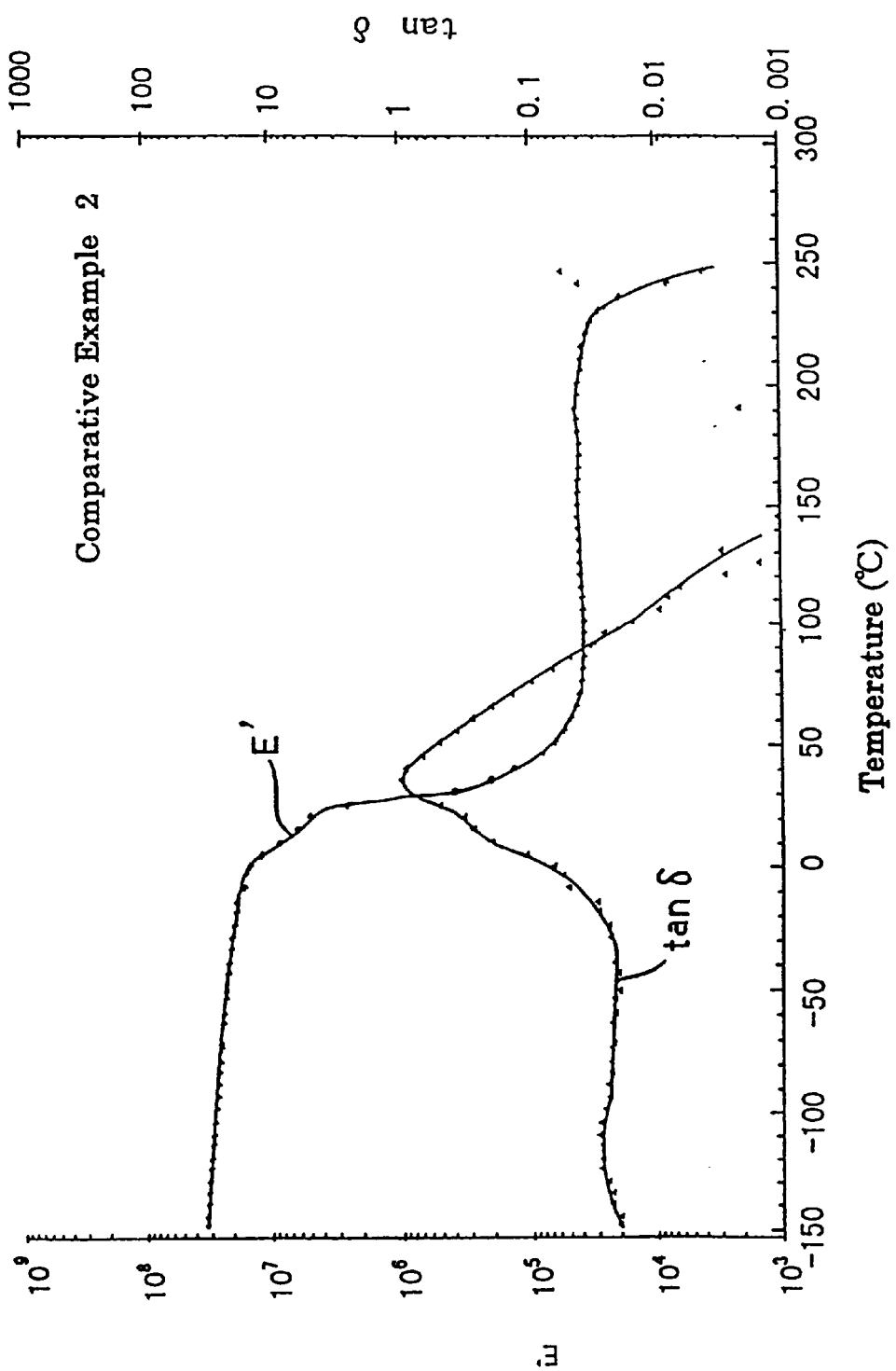
FIG. 9 shows a measurement result for viscoelasticity of Comparative Example 2.
Figure 10:
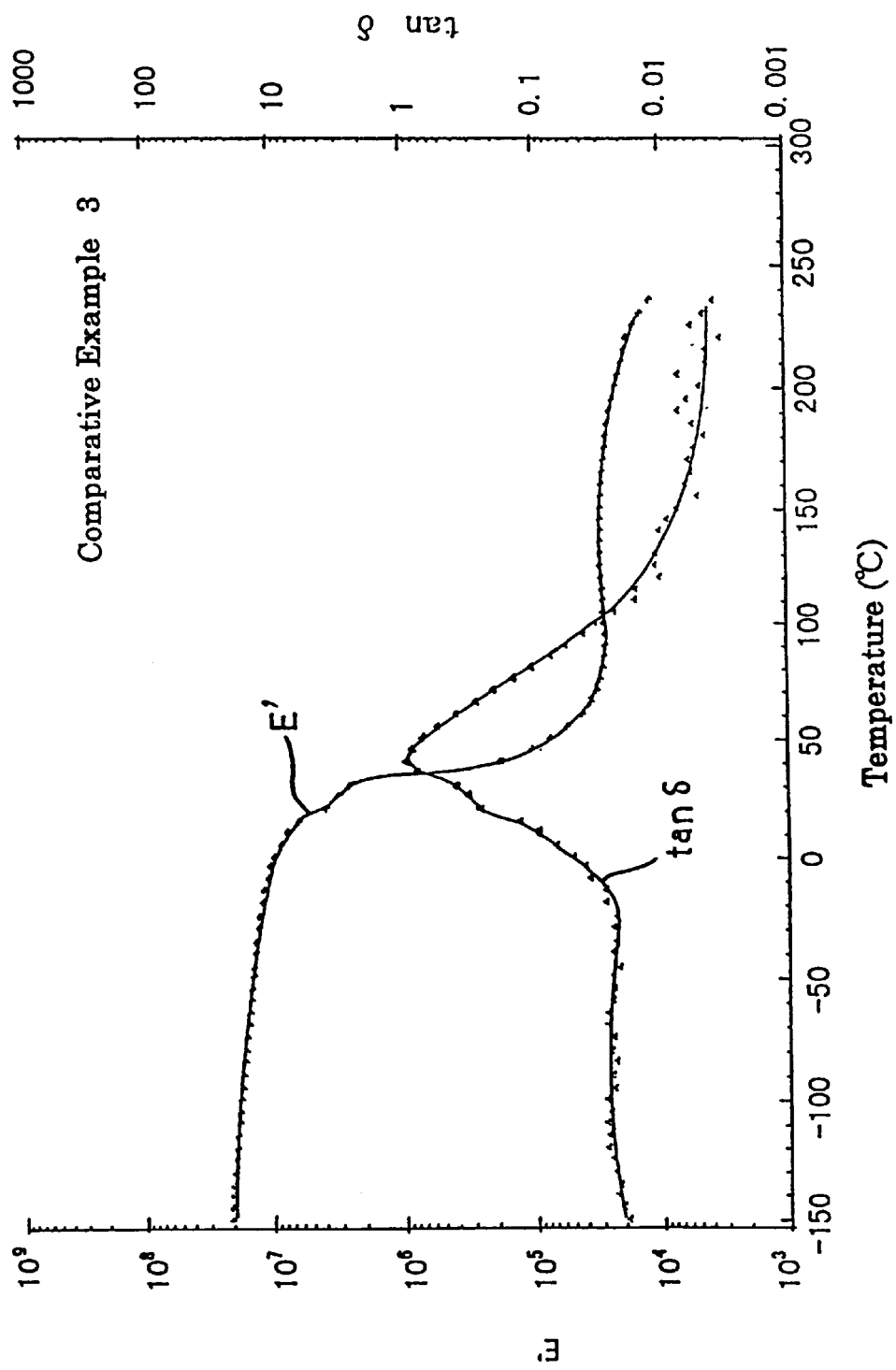
FIG. 10 shows a measurement result for viscoelasticity of Comparative Example 3.
Figure 11:
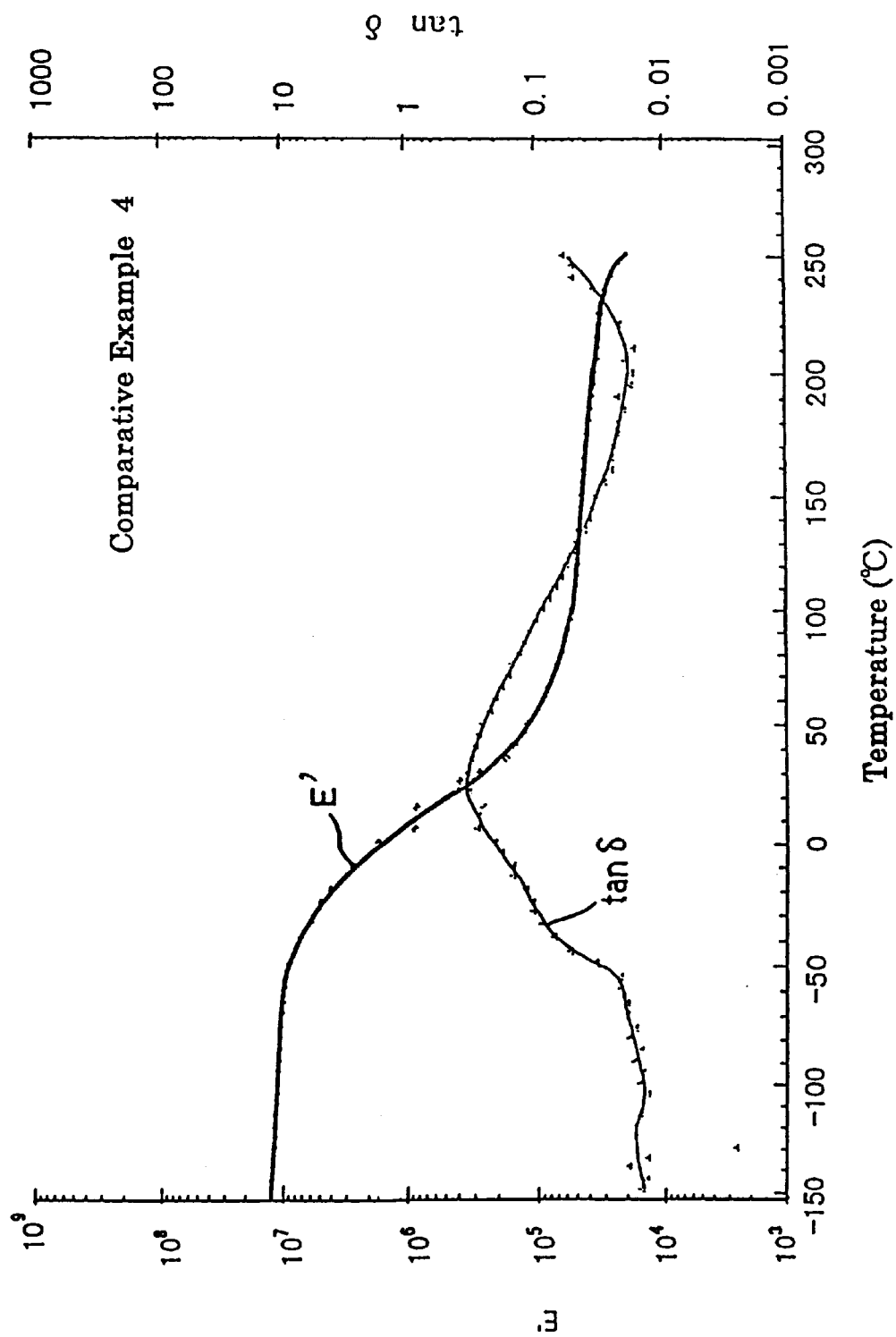
FIG. 11 shows a measurement result for viscoelasticity of Comparative Example 4.
Figure 12:
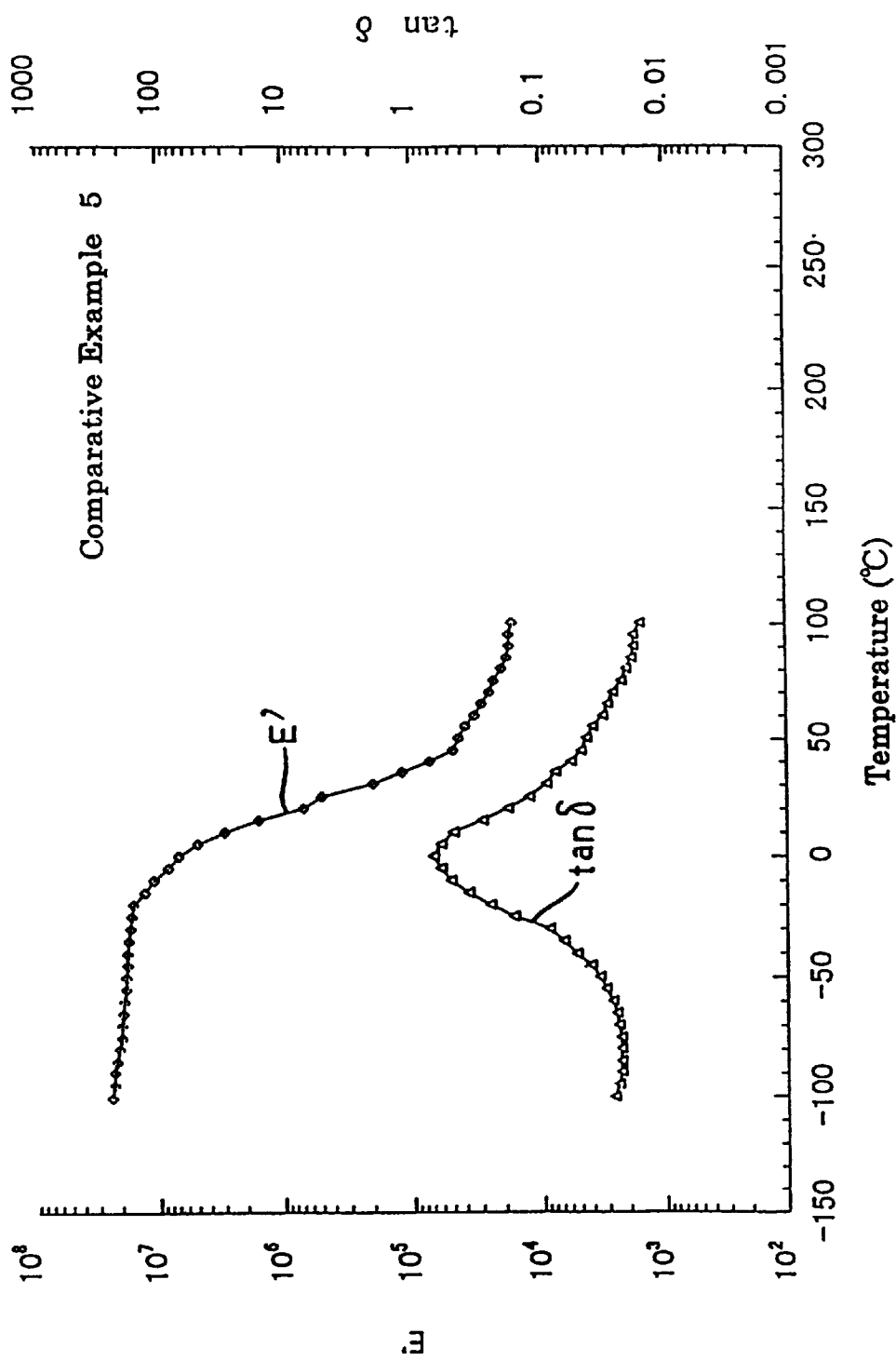
FIG. 12 shows a measurement result for viscoelasticity of Comparative Example 5.
Figure 13:
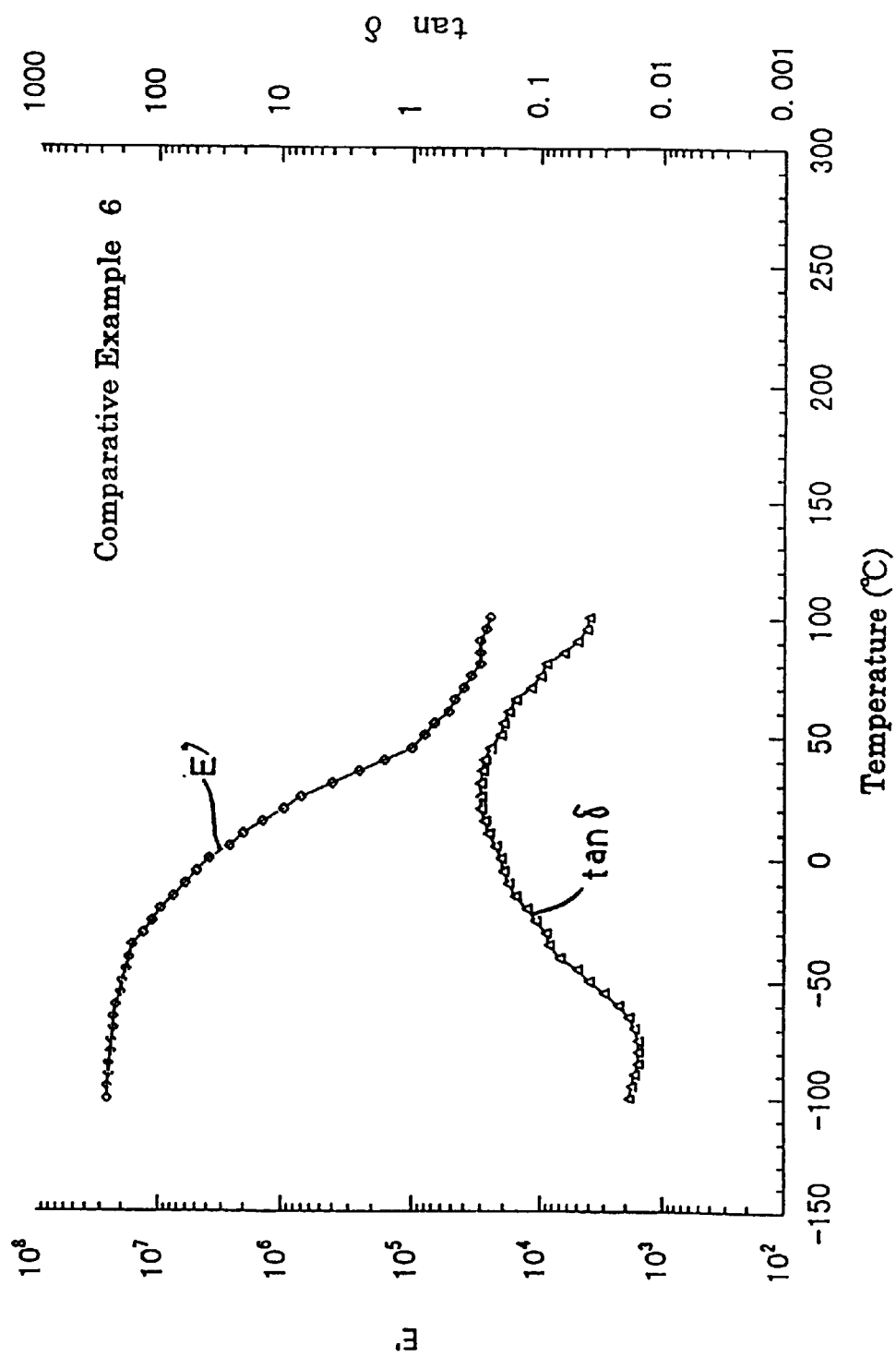
FIG. 13 shows a measurement result for viscoelasticity of Comparative Example 6.

On the other hand, FIG. 8, representing the measurement result on the viscoelasticity of the urethane foam of Comparative Example 1, shows the tan δ curve having a peak of 0.90 at 32° C. and the storage modulus (E') curve, obtained together with the tan δ curve, in which the glass transition range drops sharply from around −10° C., around which the urethane foam was in the glassy state, to around 40° C., into the rubbery range.

Comparative Example 1, which is a general type low resiliency urethane foam, showed a low ball rebound and excellent low resiliency at room temperature, as is apparent from TABLE 2. However, the urethane foam became glassy and had drastically increased hardness at low temperatures of 0° C. or less, as is apparent from FIG. 8. This is clearly seen from the values of E' at −20° C. shown in TABLE 2. Comparative Examples 2 and 3 also, in which the isocyanate index of Comparative Example 1 was varied, had only one tan δ peak at temperatures exceeding 0° C., and their hardness drastically increased at low temperatures of 0° C. or less, as seen from the values of E' at −20° C. as well.

In contrast to these, Example 1 showed a low ball rebound and an excellent low resiliency, as is apparent from TABLE 1, and its hardness did not increase so much in the temperature range from around 0° C. to around −30° C. Also, Example 1 did not come into a complete glassy state until around −50° C. This is clearly seen from the values of E' at −20° C. shown in TABLE 1.

Example 2, in which parts by weight of water of Example 1 was varied, showed a low ball rebound at room temperature, as seen from TABLE 1, and its hardness did not increase so much at temperatures of 0° C. or less, as seen from the values of E' at −20° C. in TABLE 1.

Example 3, in which the polyoxyethylene content of Example 1 was varied from 70 weight percent to 40 weight percent, showed a low ball rebound at room temperature in TABLE 1, and its hardness did not increase so much at low temperatures of 0° C. or less, as seen from the values of E' at −20° C. in TABLE 1. Example 3 showed slightly higher ball rebound and value of E' at −20° C., as compared with Example 1.

Further, Examples 4 and 5, in which the polyol (a) of Example 1 was varied from the combination of polyoxyalkylene polyester block copolymer polyol and polyoxyalkylene polyol to the polyoxyalkylene polyol only (the polyoxyethylene content also was varied from 70 weight percent to 30 weight percent), showed a low ball rebound at room temperature in TABLE 1, and their hardness did not increase so much at low temperatures of 0° C. or less, as is apparent from the values of E' at −20° C. in TABLE 1. Examples 4 and 5 showed slightly higher ball rebound and value of E' at −20° C., as compared with Example 1.

Comparative Examples 4 and 6, in which the ethylene oxide content of the polyol (a) of Example 1 was varied from 70 weight percent to 0 weight percent and 15 weight percent, respectively, showed only one tan δ peak at temperatures exceeding 0° C. and high hardness at room temperature, as shown in TABLE 2.

Comparative Example 5, in which the hydroxyl value of polyoxyalkylene polyol of Example 3 was varied (Comparative Example 5 used the hydroxyl value of 100 of the polyol (a)(7) in place of the hydroxyl values of 34 and 56 of polyoxyalkylene polyols (a)(1) and (2) of Example 3), showed high ball rebound at room temperature, as shown in TABLE 2. Also, its hardness increased at low temperatures of 0° C. or less, as is apparent from the values of E' at −20° C. in TABLE 2.

Figure 14:
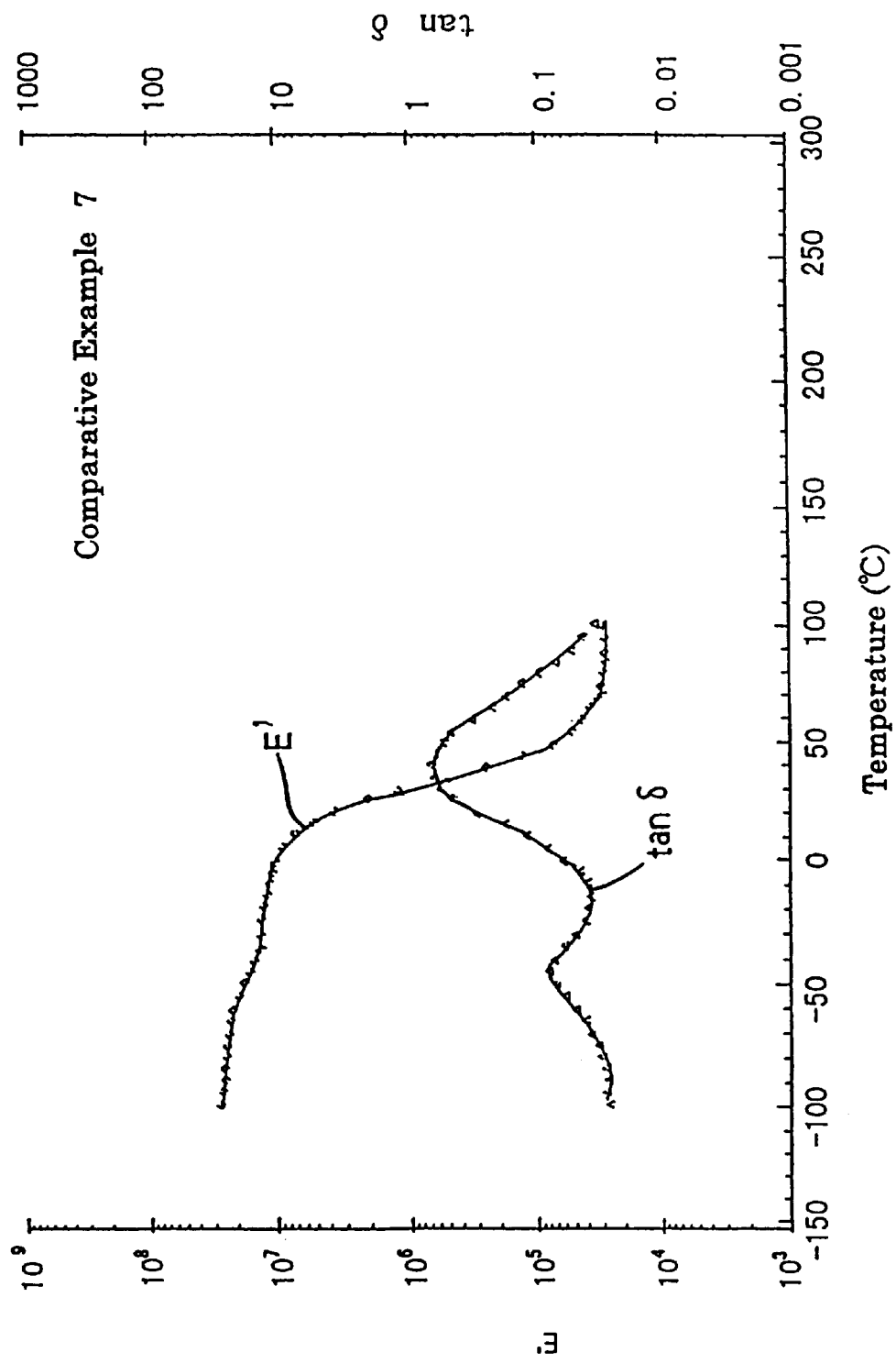
FIG. 14 shows a measurement result for viscoelasticity of Comparative Example 7.
Figure 15:
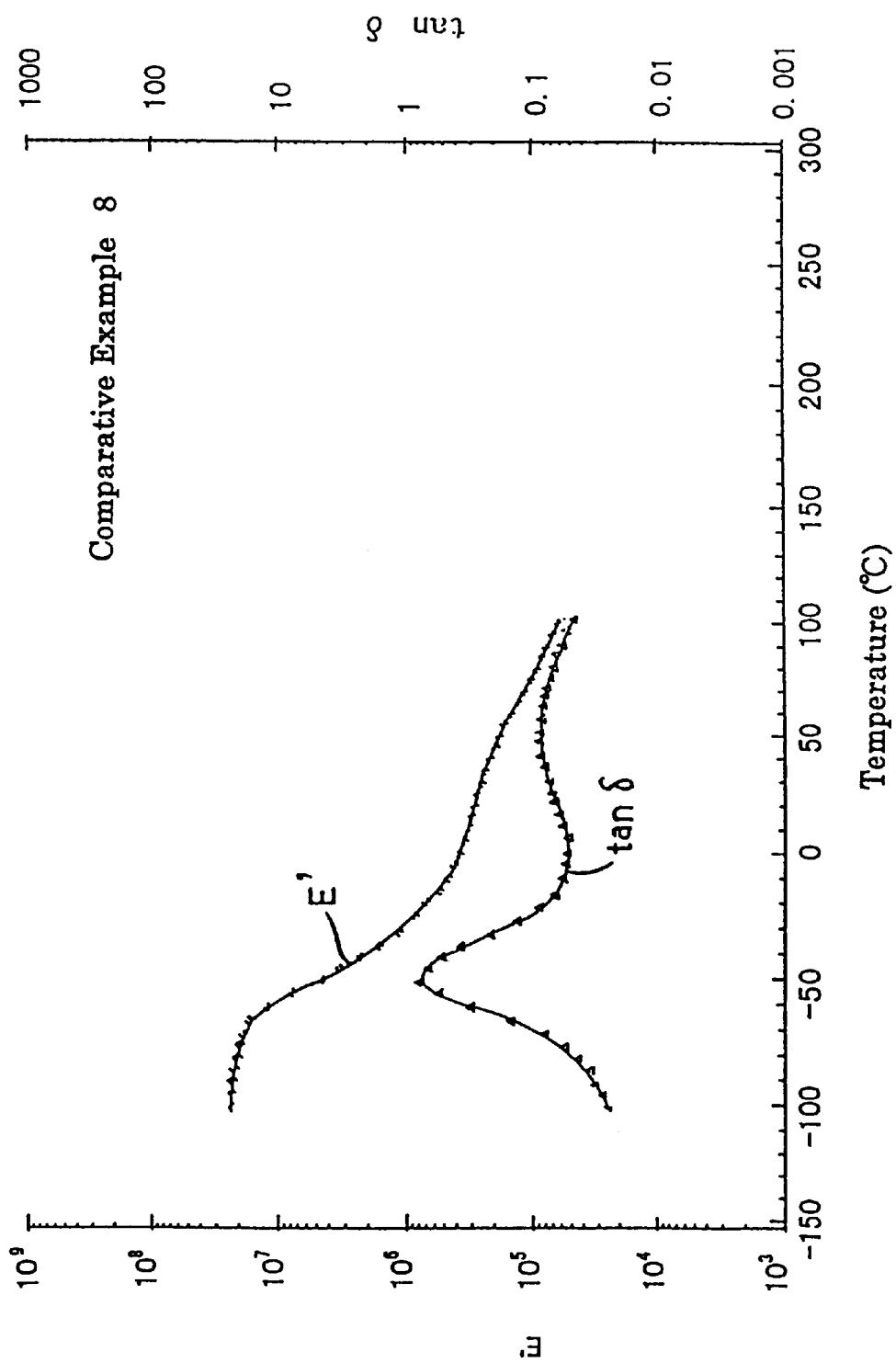
FIG. 15 shows a measurement result for viscoelasticity of Comparative Example 8.
Figure 16:
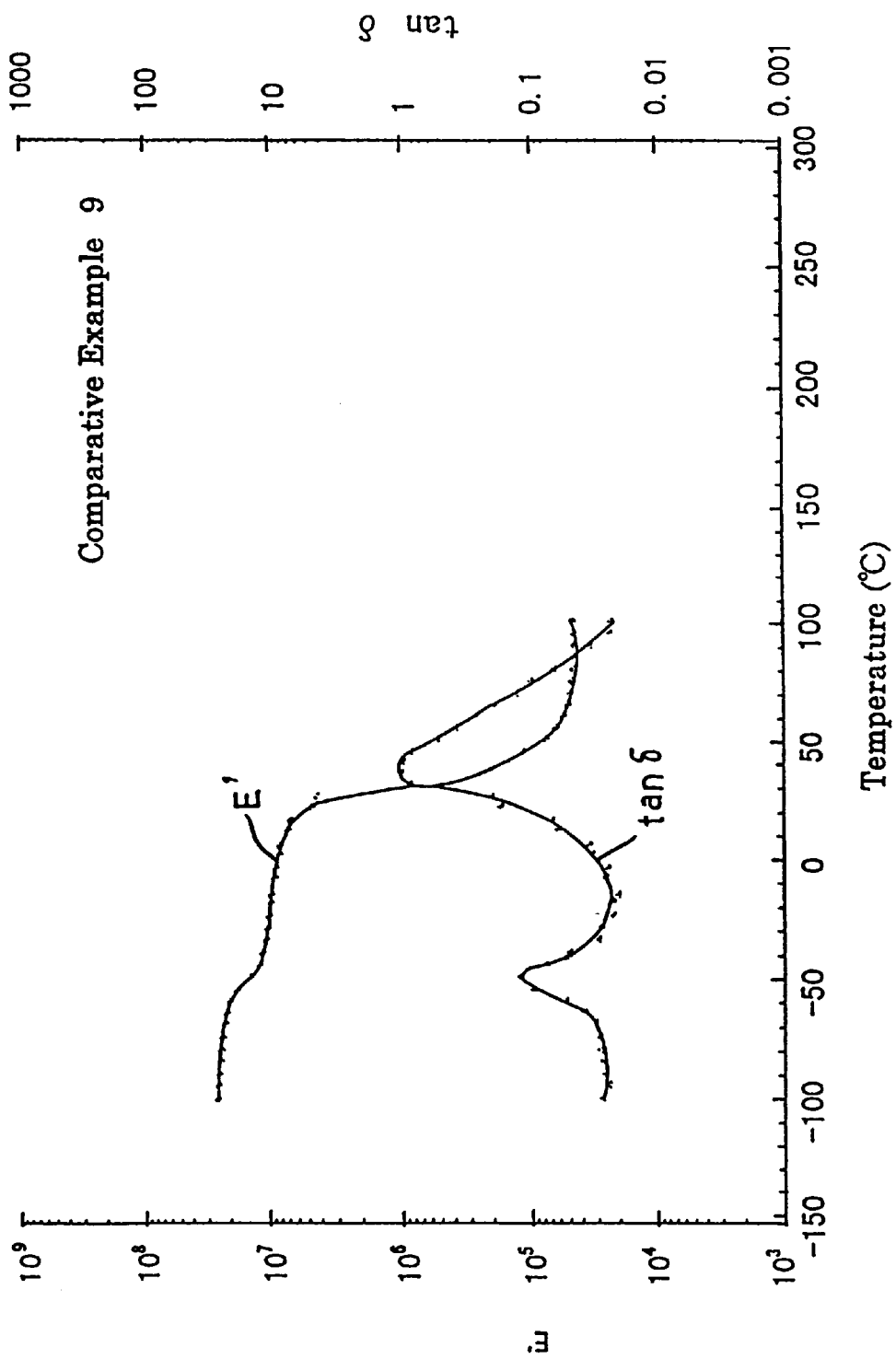
FIG. 16 shows a measurement result for viscoelasticity of Comparative Example 9.
Figure 17:
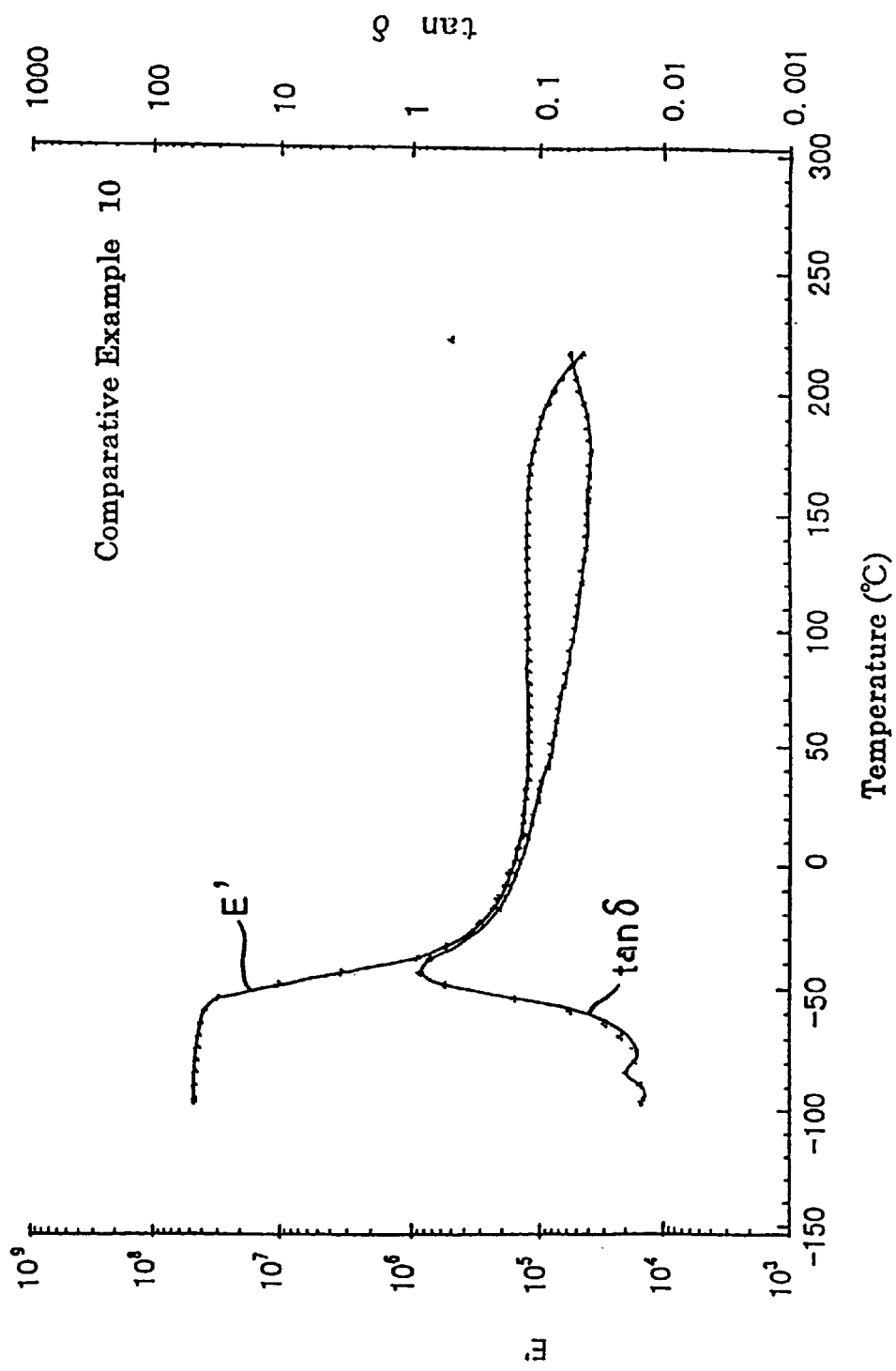
FIG. 17 shows a measurement result for viscoelasticity of Comparative Example 10.
Figure 18:
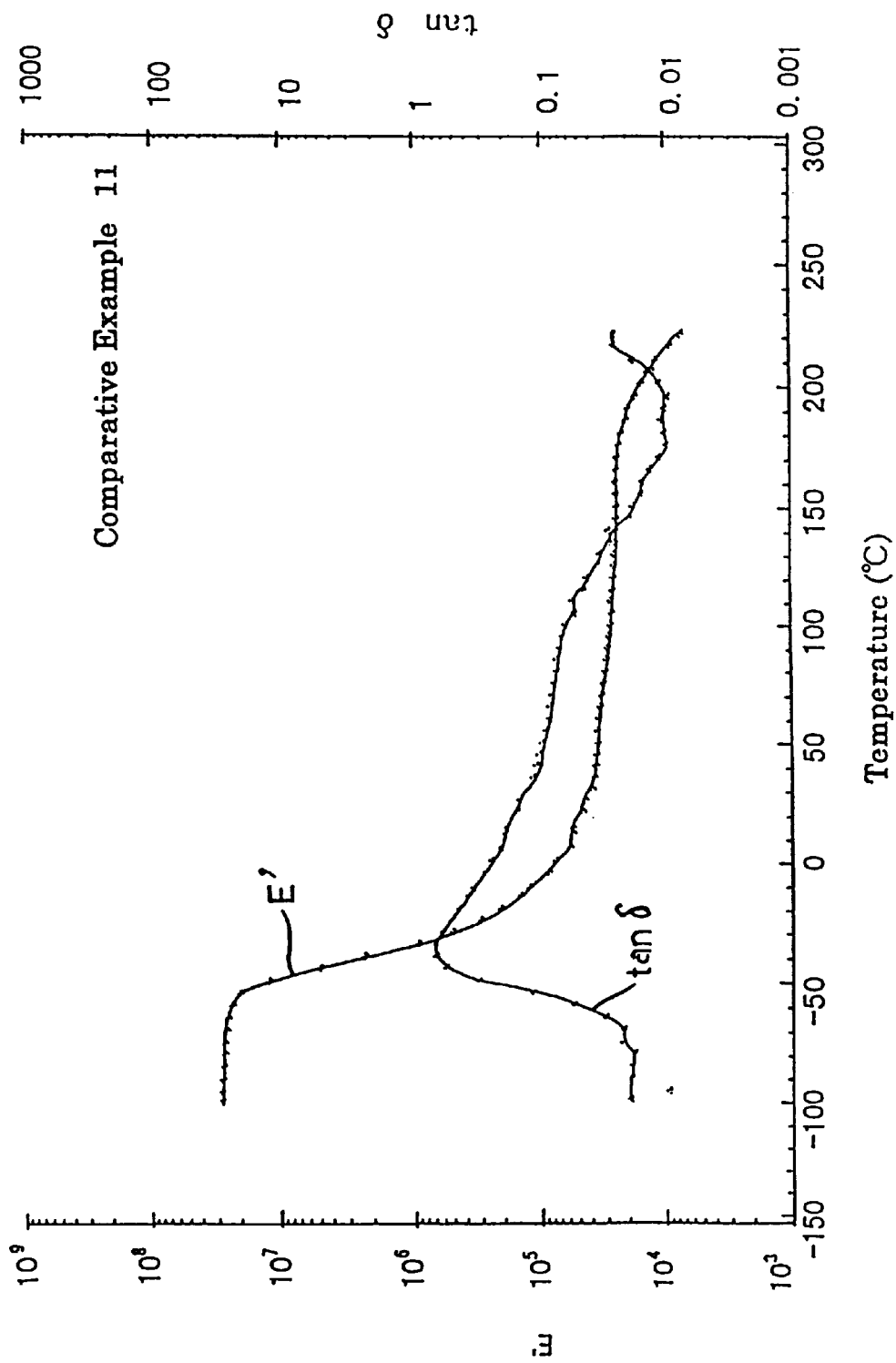
FIG. 18 shows a measurement result for viscoelasticity of Comparative Example 11.
Figure 19:
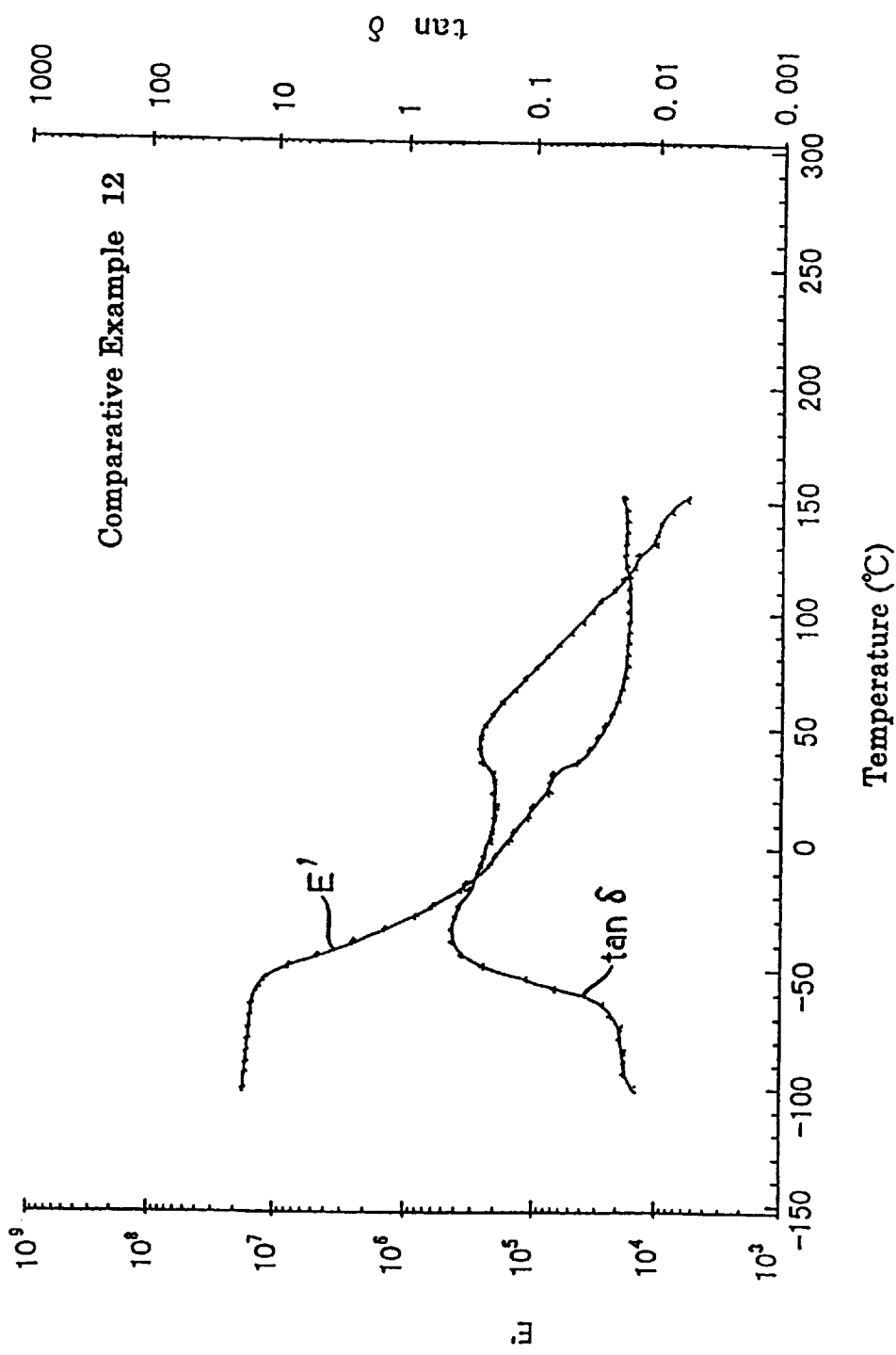
FIG. 19 shows a measurement result for viscoelasticity of Comparative Example 12.
Figure 20:
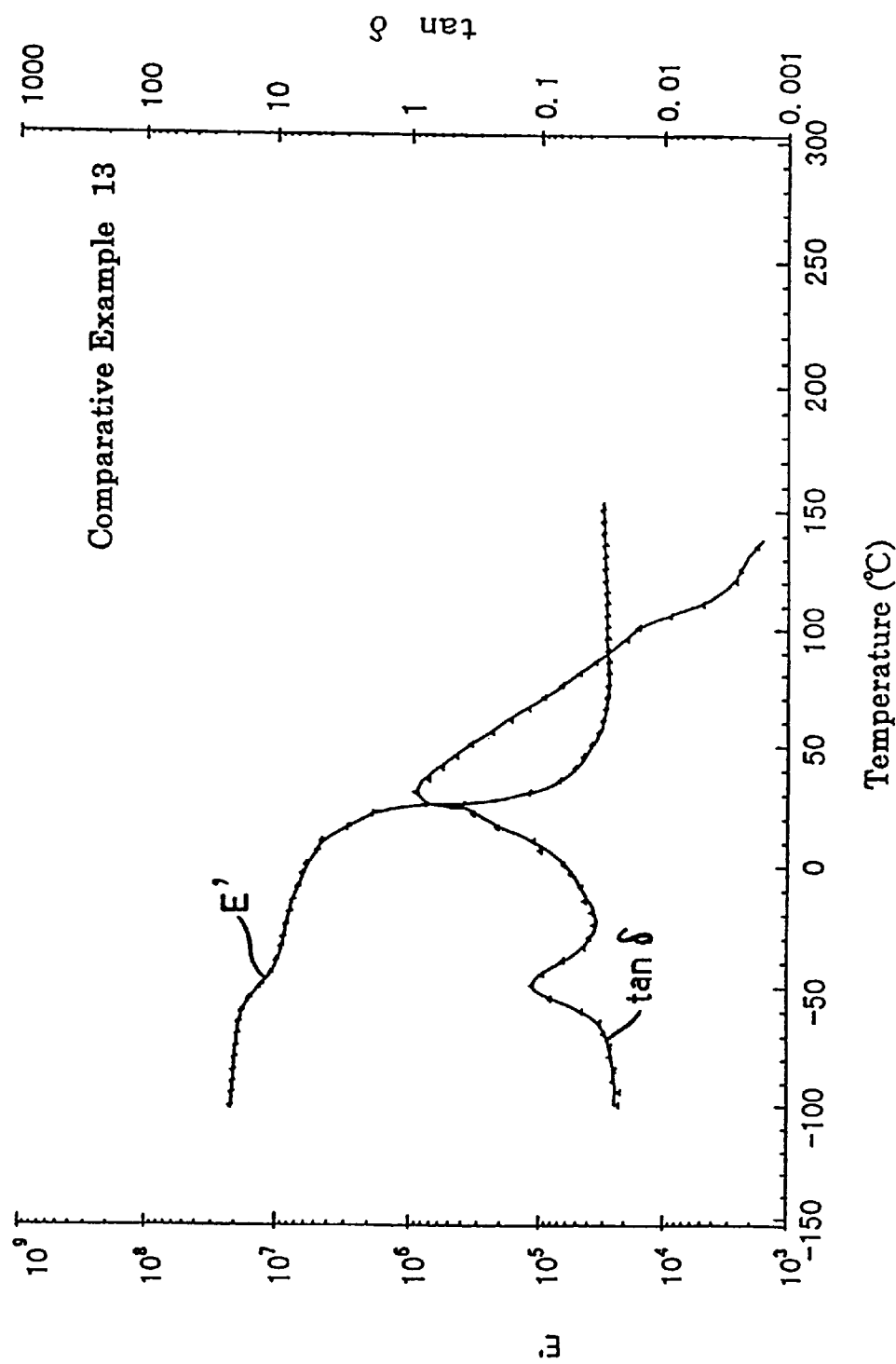
FIG. 20 shows a measurement result for viscoelasticity of Comparative Example 13.
Figure 21:
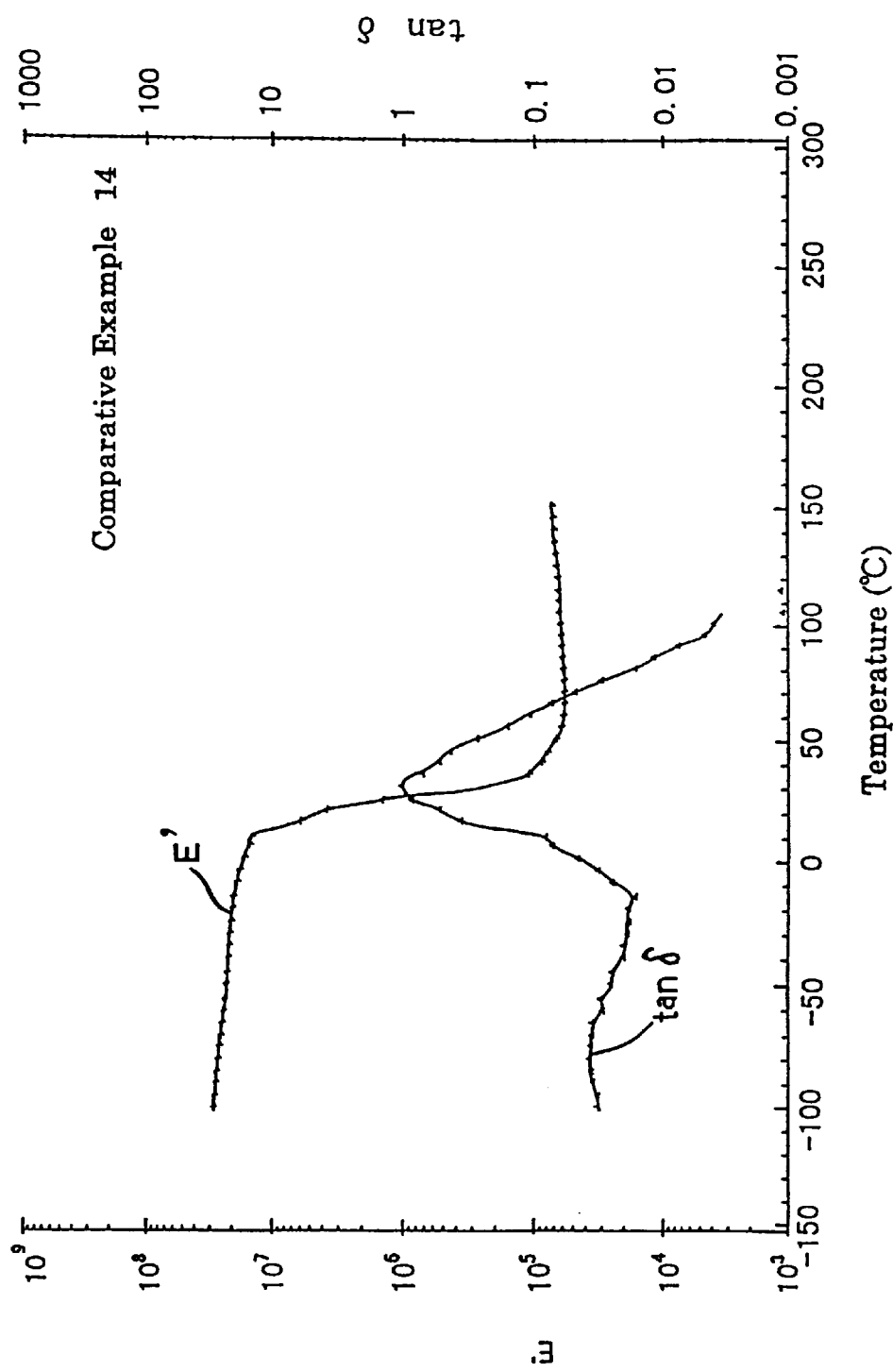
FIG. 21 shows a measurement result for viscoelasticity of Comparative Example 14.

Further, Comparative Examples 7–9 had the tan δ peak in each of the temperature range of −70° C. to −20° C. and the temperature range of 0° C. to 60° C., as is apparent from FIGS. 14–16. However, it is seen from TABLE 2 that Comparative Example 7 showing the tan δ peak of 0.08 at the temperature of −45° C. had high hardness at room temperature. Also, it is seen that Comparative Example 8 showing the tan δ peak of 0.09 at 56° C. was too high in ball rebound to be used as a low resilience urethane foam.

In addition, it is seen that Comparative Example 9 showing the tan δ peak of 0.12 at −50° C., showed high hardness at room temperature. In contrast to this, Example 5 showing the tan δ peak of 0.16 at −49° C., did not show so much increase in hardness.

Figure 22:
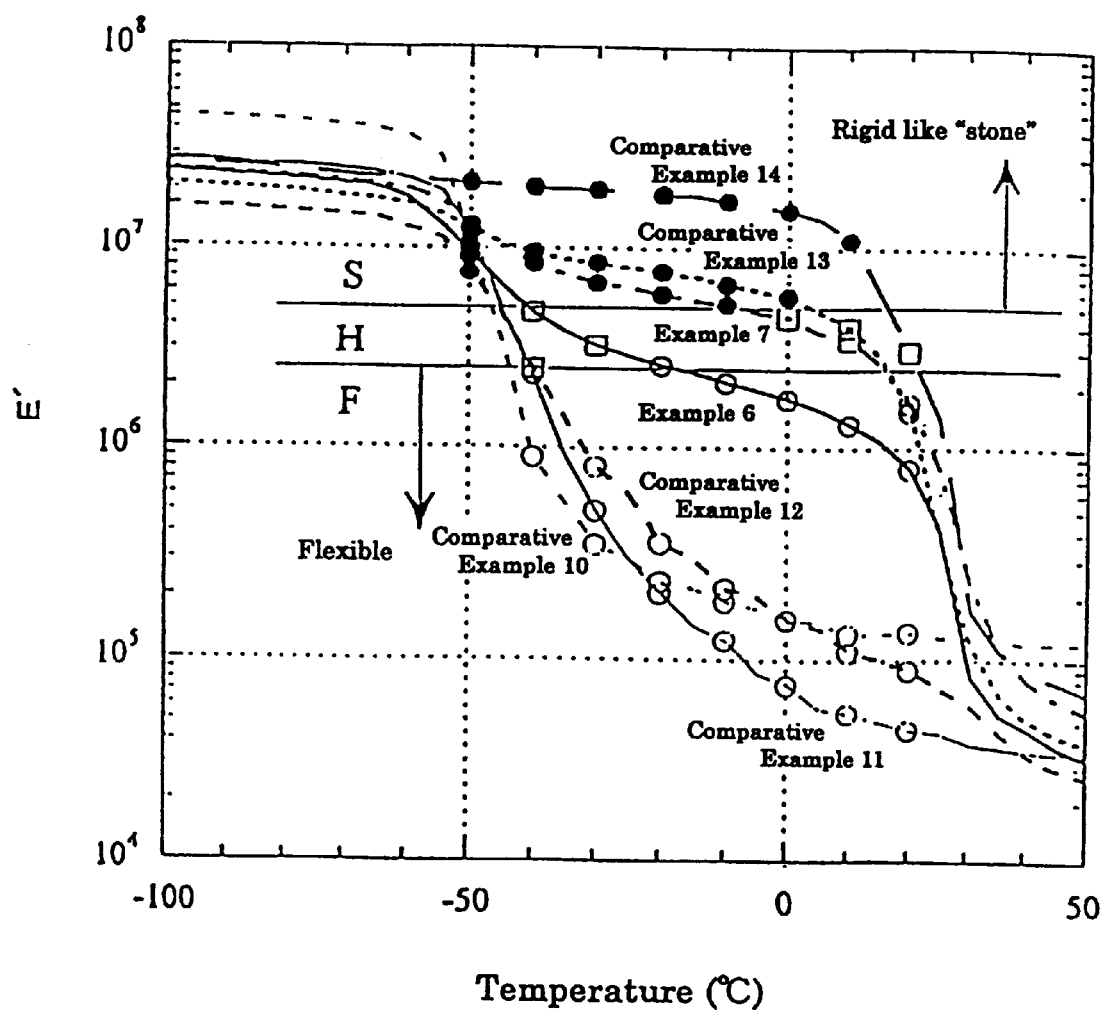
FIG. 22 shows a diagram plotting curves for storage modulus (E') of Examples 6 and 7 and Comparative Examples 10–14.

Further, when the storage modulus (E') curves of Examples 6 and 7 and Comparative Examples 10–14 are plotted in FIG. 22 and further the evaluation on hardness by contact finger shown in TABLE 3 is superimposed upon the plotted FIG. 22, a distinction between the stone-like rigid "S" and the high load bearing flexible "H" comes into existence at 5 MPa. Therefore, for example, Example 6 showing the storage modulus (E') of 5 MPa or less at temperature of not less than −40° C. was flexible and did not show any increase in hardness at −20° C.

While a detailed description of the present invention has been provided above, this description should be considered illustrative. The present invention is not limited thereto, but rather is defined by the following claims.

What is claimed is:

1. Low resilience urethane foam produced by reaction of urethane foam compositions comprising polyol (a), polyisocyanate (b), catalyst (c) and blowing agent (d), wherein:

the low resilience urethane foam has at least one glass transition point in each of a temperature range of −70° C. to −20° C. and a temperature range of 0° C. to 60° C.; and where the glass transition point is expressed as a tan δ peak obtained when measurement on dynamic viscoelasticity of the low resilience urethane foam is carried out at a frequency of 10 hertz, at least one of the tan δ peak(s) in the temperature range of −70° C. to −20° C. is 0.15 or more and at least one of the tan δ peak(s) in the temperature range of 0° C. to 60° C. is 0.3 or more;

further wherein the polyol (a) comprises polyol (a-1) of 1.5 to 4.5 in average functionality and 20–70 mgKOH/g in hydroxyl value; and polyol (a-2) of 1.5 to 4.5 in average functionality and 140–300 mgKOH/g in hydroxyl value and contains therein the polyol (a-1) in an amount from 32 weight percent to 80 weight percent and the polyol (a-2) in an amount from 20 weight percent to 68 weight percent; and further the polyol (a-2) is polyoxyalkylene polyol in which an oxyethylene unit of not less than 20 weight percent is contained in the oxyalkylene unit.

2. Low resilience urethane foam according to claim 1, wherein the polyol (a) is at least one polyol selected from the group consisting of polyoxyalkylene polyol, vinyl polymer-containing polyoxyalkylene polyol, polyester polyol, and polyoxyalkylene polyester block copolymer polyol.

3. Low resilience urethane foam according to claim 1, wherein the polyol (a-1) comprises polyoxyalkylene polyol and polyoxyalkylene polyester block copolymer polyol and contains therein the polyoxyalkylene polyol and the polyoxyalkylene polyester block copolymer polyol, in amounts from 30 weight percent to 70 weight percent, respectively.

4. Low resilience urethane foam according to claim 1, wherein the polyol (a-2) is polyoxyalkylene polyol in which an oxyethylene unit of not less than 60 weight percent is contained in the oxyalkylene unit.

5. Low resilience urethane foam according to claim 1, wherein the polyisocyanate (b) is toluene diisocyanate.

6. Low resilience urethane foam according to claim 1, wherein the blowing agent (d) is water.

7. Low resilience urethane foam according to claim 1, wherein a storage modulus (E'), which is obtained together with the tan δ peak when the measurement on the dynamic viscoelasticity of the low resilience urethane foam is carried out at a frequency of 10 herz, is not more than 5 MPa at a temperature of not less than 0° C.

8. Low resilience urethane foam according to claim 1, wherein the storage modulus (E'), which is obtained together with the tan δ peak when the measurement on the dynamic viscoelasticity of the low resilience urethane foam is carried out at a frequency of 10 herz, is not more than 5 MPa at temperature of not less than −20° C.

* * * * *